United States Patent
Naruse

(10) Patent No.: US 9,230,252 B2
(45) Date of Patent: Jan. 5, 2016

(54) SYSTEM INCLUDING A COMMUNICATION TERMINAL, AND A PROCESSING APPARATUS CONFIGURED TO EXECUTE A JOB RECEIVED FROM THE COMMUNICATION TERMINAL

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/321,112

(22) Filed: Jul. 1, 2014

(65) Prior Publication Data

US 2015/0036176 A1 Feb. 5, 2015

(30) Foreign Application Priority Data

Jul. 31, 2013 (JP) .................................. 2013-159714

(51) Int. Cl.
G06Q 20/32 (2012.01)
H04N 1/00 (2006.01)

(52) U.S. Cl.
CPC ....... *G06Q 20/3278* (2013.01); *H04N 1/00925* (2013.01)

(58) Field of Classification Search
CPC ....... H04W 4/00; H04W 4/24; G06Q 20/3278
USPC ............ 358/1.13, 1.15; 705/44, 39; 455/41.1, 455/41.2; 726/7
See application file for complete search history.

(56) References Cited

U.S. PATENT DOCUMENTS

2010/0320266 A1* 12/2010 White .......................... 235/375
2012/0101885 A1*  4/2012 Lee et al. ................... 705/14.23
2013/0229672 A1    9/2013 Naruse

FOREIGN PATENT DOCUMENTS

| JP | 2003-67832 A  | 3/2003 |
| JP | 2006-48270 A  | 2/2006 |
| JP | 2007-58462 A  | 3/2007 |
| JP | 2007-140990 A | 6/2007 |

OTHER PUBLICATIONS

U.S. Appl. No. 14/337,795, filed Jul. 22, 2014. Applicant: Taketomo Naruse, et al.
U.S. Appl. No. 14/332,174, filed Jul. 15, 2014. Applicant: Taketomo Naruse.

* cited by examiner

*Primary Examiner* — Jacky X Zheng
(74) *Attorney, Agent, or Firm* — Fitzpatrick, Cella, Harper & Scinto

(57) ABSTRACT

An image forming apparatus stores, in a storage unit, a plurality of charging tables for calculating a charging amount in execution of a job. A communication terminal acquires a charging table from the storage unit based on identification information for identifying a communication terminal, and calculates, based on the acquired charging table, a charging amount for a job to be transmitted to the image forming apparatus. The calculated charging amount is displayed.

12 Claims, 18 Drawing Sheets

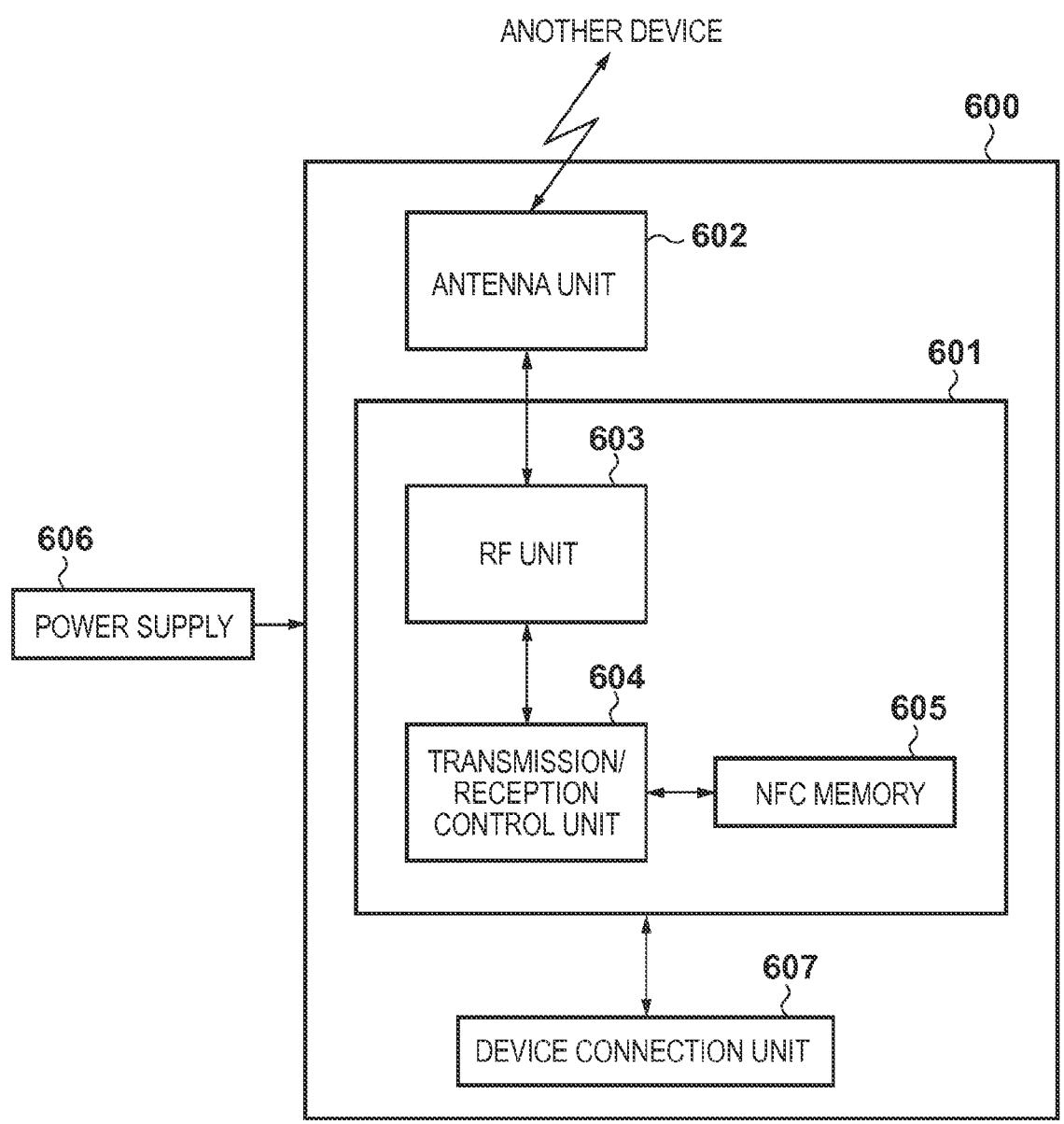

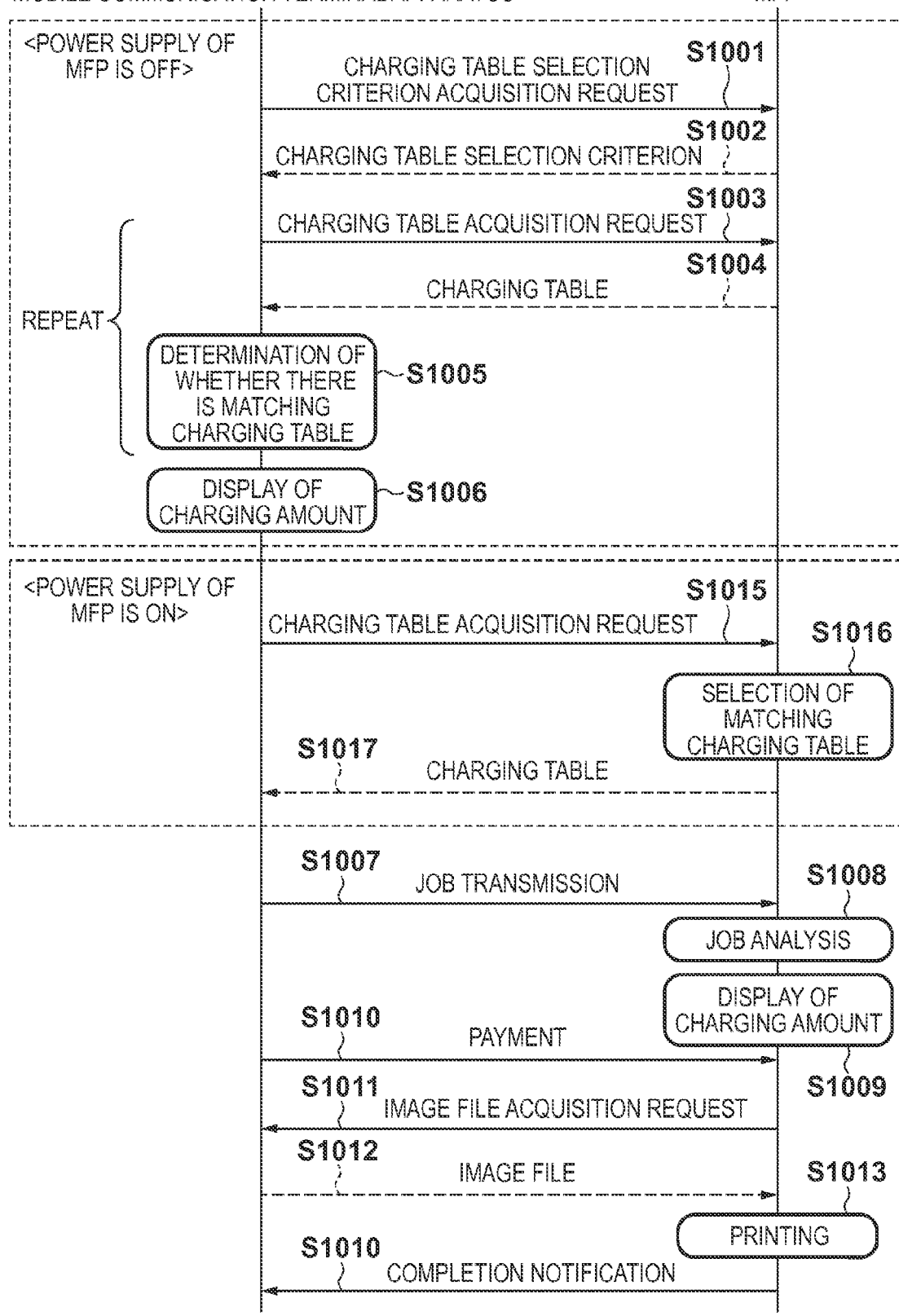

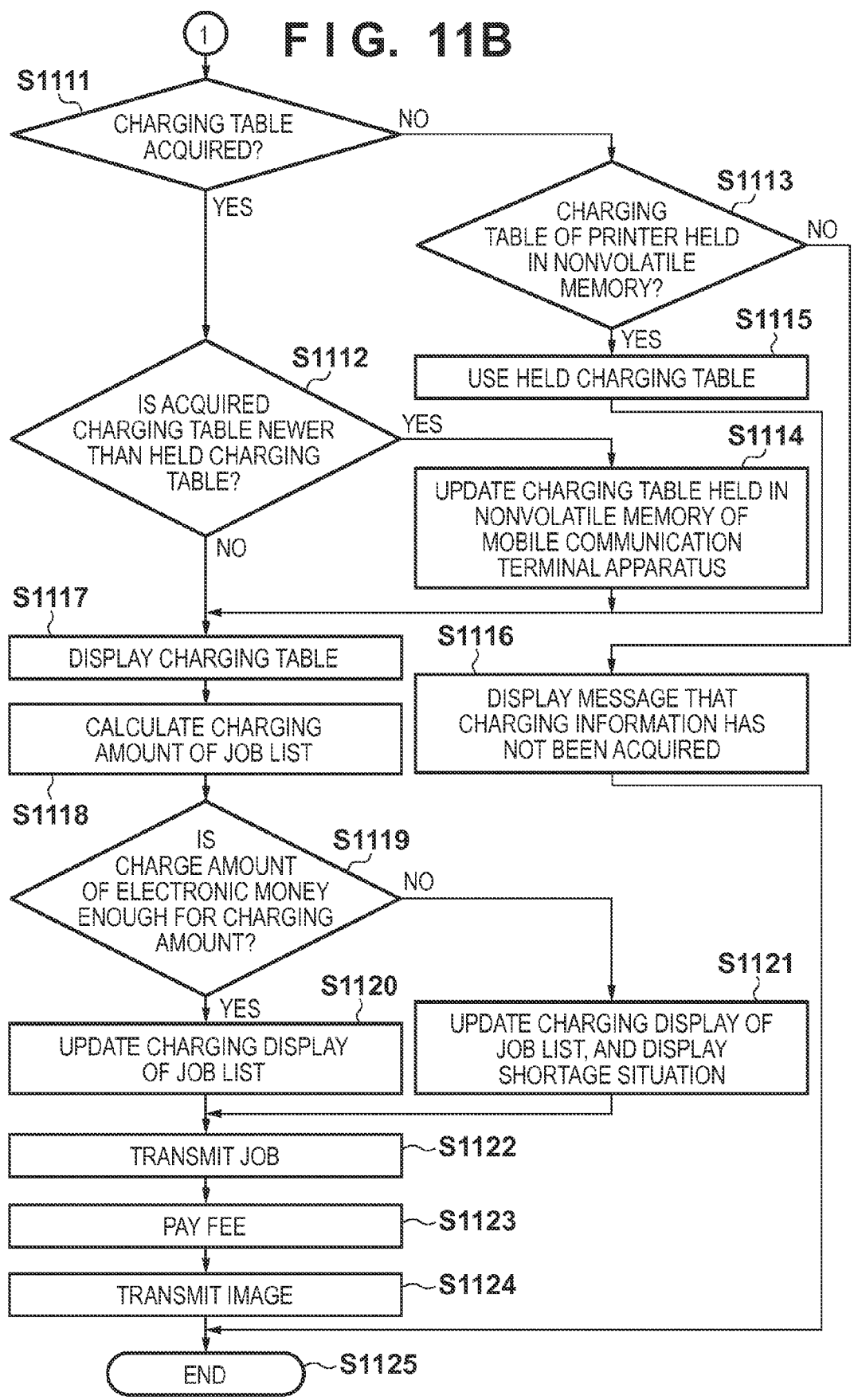

FIG. 14A

```
JOB1    PRINT       2PAGES    ¥??
JOB2    PRINT       5PAGES    ¥??
JOB3    CREATING              ¥??
JOB4    FAX         10PAGES   ¥??
                    TOTAL     ¥???
```

FIG. 14B

```
JOB1    PRINT       2PAGES    ¥20
JOB2    PRINT       5PAGES    ¥50
JOB3    CREATING              ¥??
JOB4    FAX         10PAGES   ¥150
                    TOTAL     ¥220

CHARGE AMOUNT   ¥500
```

FIG. 14C

```
JOB1    PRINT       2PAGES    ¥20
JOB2    PRINT       5PAGES    ¥50
JOB3    CREATING              ¥??
JOB4    FAX         10PAGES   ¥150
                    TOTAL     ¥220

CHARGE AMOUNT   ¥200 (¥20 SHORT)
```

FIG. 14D

```
JOB1    PRINT       2PAGES    ¥??
JOB2    PRINT       5PAGES    ¥??
JOB3    CREATING              ¥??
JOB4    FAX         10PAGES   ¥??
                    TOTAL     ¥???

CHARGING TABLE CANNOT BE ACQUIRED,
SO CHARGING AMOUNT IS CALCULATED
BASED ON PREVIOUS TABLE
```

F I G. 15A

```
JOB1    PRINT    2PAGES    ¥20
JOB2    PRINT    5PAGES    ¥50
JOB4    FAX      10PAGES   ¥150
―――――――――――――――――――――――――――――――
                  TOTAL    ¥220

CHARGING TABLE IS DIFFERENT
FROM ONE IN ESTIMATION
Ver1.00.05 (ESTIMATION)
Ver1.00.07 (PRESENT)
```

F I G. 15B

```
JOB1    PRINT    2PAGES    ¥20
JOB2    PRINT    5PAGES    ¥50
JOB4    FAX      10PAGES   ¥150
―――――――――――――――――――――――――――――――
                  TOTAL    ¥270

AMOUNT OF MONEY IS DIFFERENT
FROM ONE IN ESTIMATION
¥220 (ESTIMATION)
```

F I G. 16A
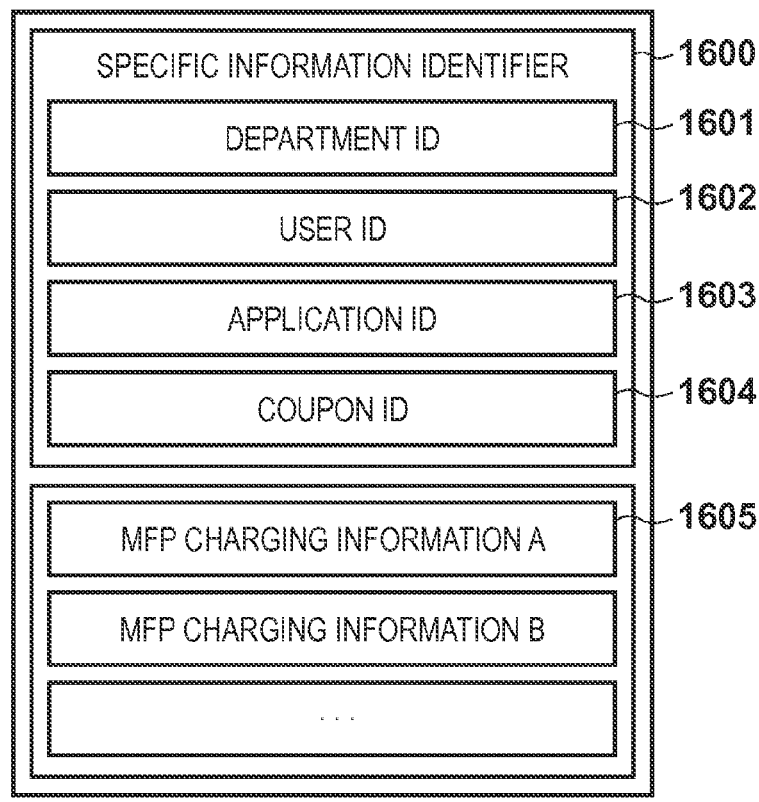
F I G. 16B
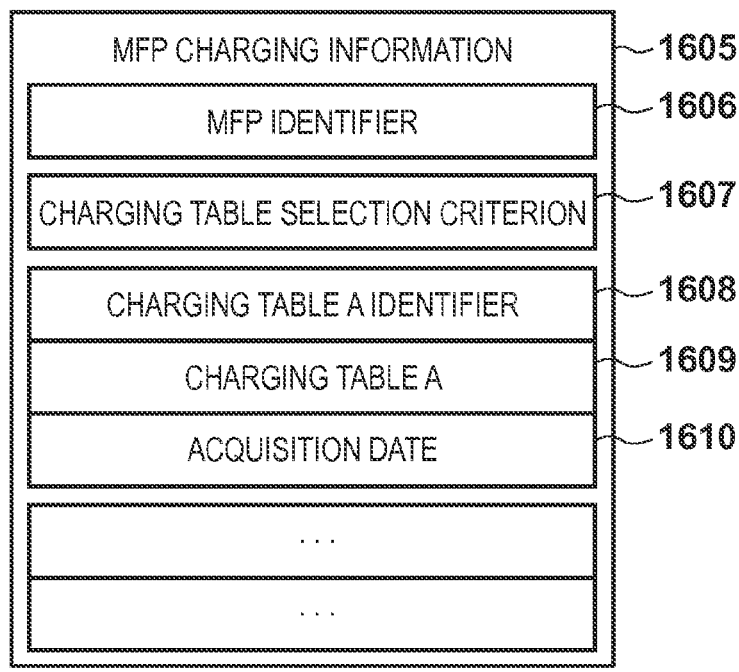

FIG. 17A

| | DEPARTMENT ID | USER ID | APPLICATION ID | COUPON ID | |
|---|---|---|---|---|---|
| CHARGING TABLE SELECTION CRITERION | 1 | 0 | 0 | 0 | |
| CHARGING TABLE A IDENTIFIER | 1*** | **** | **** | **** | 708 |
| CHARGING TABLE B IDENTIFIER | 2*** | **** | **** | **** | 710 |
| EXAMPLE 1 OF SPECIFIC INFORMATION IDENTIFIER | 1567 | 2345 | 0002 | 1234 | ⇒ CHARGING TABLE A |
| EXAMPLE 2 OF SPECIFIC INFORMATION IDENTIFIER | 2567 | 2345 | 0001 | 1234 | ⇒ CHARGING TABLE B |

| | DEPARTMENT ID | USER ID | APPLICATION ID | COUPON ID | |
|---|---|---|---|---|---|
| CHARGING TABLE SELECTION CRITERION | 1 | 0 | 0 | 0 | |
| CHARGING TABLE A IDENTIFIER | 1*** | **** | 000* | 1234 | |
| CHARGING TABLE B IDENTIFIER | 2*** | **** | **** | 9999 | |
| EXAMPLE 3 OF SPECIFIC INFORMATION IDENTIFIER | 1567 | 2345 | 0002 | 0000 | ⇒ CHARGING TABLE A |
| EXAMPLE 4 OF SPECIFIC INFORMATION IDENTIFIER | 1567 | 2345 | 0001 | 9999 | ⇒ CHARGING TABLE B |
| EXAMPLE 5 OF SPECIFIC INFORMATION IDENTIFIER | 2567 | 2345 | 0001 | 0000 | ⇒ DEFAULT CHARGING TABLE |

FIG. 18A

EDIT CHARGING TABLE SELECTION CRITERION ~1801

| DEPARTMENT ID | 1 | ~1802 |
| USER ID | 0 | |
| APPLICATION ID | 0 | |
| COUPON ID | 0 | |

FIG. 18B

EDIT CHARGING TABLE

| CHARGING TABLE A | ~1803 |
| CHARGING TABLE B | |
| CHARGING TABLE C | |
| CHARGING TABLE D | |

FIG. 18C

SELECT ITEM TO BE MODIFIED

| CHARGING TABLE A IDENTIFIER | ~1804 |
| CHARGING TABLE A PRINT JOB | ~1805 |
| CHARGING TABLE A SCAN JOB | |
| CHARGING TABLE A FAX JOB | |

FIG. 18D

EDIT CHARGING TABLE A IDENTIFIER

1806— | DEPARTMENT ID | 1 * * * | ~1807
| USER ID | * * * * |
| APPLICATION ID | 000 * |
| COUPON ID | 1234 |

FIG. 18E

CHARGING TABLE A PRINT JOB SELECT ITEM TO BE MODIFIED

1808— SIZE-BASED FEE
1809— PAPER TYPE-BASED FEE
1810— PRINTING MODE-BASED FEE

FIG. 18F

CHARGING TABLE A PRINT JOB MODIFY SIZE-BASED FEE

1811— | B5 | ¥5 | ~1812
| A4 | ¥10 |
| A3 | ¥30 |
| A2 | ¥80 |

SYSTEM INCLUDING A COMMUNICATION TERMINAL, AND A PROCESSING APPARATUS CONFIGURED TO EXECUTE A JOB RECEIVED FROM THE COMMUNICATION TERMINAL

BACKGROUND OF THE INVENTION

1. Field of the Invention

The present invention relates to a system which calculates a charging amount, a communication terminal, an information processing method, and a storage medium storing a program.

2. Description of the Related Art

Conventionally, MFPs (Multi Function Printers) having, for example, printing, scanning, and facsimile functions have been introduced in schools and convenience stores. In general, an MFP installed in a public area makes a charge every time it is used. The MFP often takes a use system in which the user inserts money in advance and then the service starts. The fee system used in charging is managed in a charging table, and the charging table is held in the MFP. A charging amount on a user is decided by the setting of a job to be executed. There is known a system in which a charging apparatus is installed on a network and the fee is calculated for a requested print job (Japanese Patent Laid-Open No. 2003-67832). Further, there is known a system in which even when no network is usable, a charge is estimated by downloading an estimation software tool of estimating a charge (Japanese Patent Laid-Open No. 2007-58462).

There is also known a technique of paying a value of printing executed by an MFP by general-purpose electronic money stored in an IC card or the like (Japanese Patent Laid-Open No. 2007-140990). In a value collection system described in Japanese Patent Laid-Open No. 2003-67832, a print job transmitted from a terminal is printed after a printing device charges for the print job by using general-purpose electronic money. In this system, an information terminal such as a PC transmits a print job, and another IC card is charged for the print job. There is also known a technique of incorporating the mechanism of general-purpose electronic money of an IC card in a mobile communication terminal apparatus (Japanese Patent Laid-Open No. 2006-48270).

There is a demand for easily knowing the fee of a job before an MFP executes a job. Conventionally, the fee is known after an MFP executes a job, or the fee is estimated after a job is transmitted from a communication terminal.

However, in the system disclosed in Japanese Patent Laid-Open No. 2003-67832, when the charging system goes down owing to any cause or when the charging server is intensively accessed, a response to a user may not be sent or may delay. In the system described in Japanese Patent Laid-Open No. 2007-58462, every time the charging table is updated, a new software tool is downloaded. However, depending on the network communication situation, it is not guaranteed that the download will always succeed. For example, when the server cannot be accessed, the software tool cannot be downloaded.

In the system disclosed in Japanese Patent Laid-Open No. 2007-58462, a software tool needs to be downloaded in advance. When making an estimate in a new apparatus, the software tool needs to be downloaded first. Also, it is necessary to designate an apparatus for downloading, and this requires an operation of reliably selecting a desired apparatus from a list displayed on a display unit.

SUMMARY OF THE INVENTION

An aspect of the present invention is to eliminate the above-mentioned problems with the conventional technology. The present invention provides a system which easily, reliably acquires the charging amount of a job, a communication terminal, an information processing method, and a storage medium storing a program.

The present invention in one aspect provides a system including a communication terminal, and a processing apparatus configured to execute a job received from the communication terminal, comprising: an acquisition unit configured to acquire, from the processing apparatus, a charging method which is used to specify a charging amount in execution of the job, and corresponds to identification information held in the communication terminal; and a specifying unit configured to specify, based on the charging method acquired by the acquisition unit, a charging amount for the job to be transmitted from the communication terminal to the processing apparatus.

According to the present invention, the charging amount of a job can be easily, reliably acquired.

Further features of the present invention will become apparent from the following description of exemplary embodiments with reference to the attached drawings.

BRIEF DESCRIPTION OF THE DRAWINGS

FIG. 6 is a block diagram for explaining details of an NFC unit;

FIG. 10 is a chart for explaining processing of selecting a charging table matching a condition;

FIGS. 11A and 11B are flowcharts for explaining a sequence in the mobile communication terminal apparatus;

FIGS. 14A to 14D are views each showing a screen displayed on the display unit of the mobile communication terminal apparatus;

FIGS. 15A and 15B are views each showing a warning screen displayed on the MFP;

FIGS. 16A and 16B are views each showing the structure of the nonvolatile memory of the mobile communication terminal apparatus;

FIGS. 17A and 17B are views for explaining an algorithm to select a charging table; and FIGS. 18A to 18F are views each showing a screen displayed on the mobile communication terminal apparatus or MFP.

DESCRIPTION OF THE EMBODIMENTS

Figure 1:
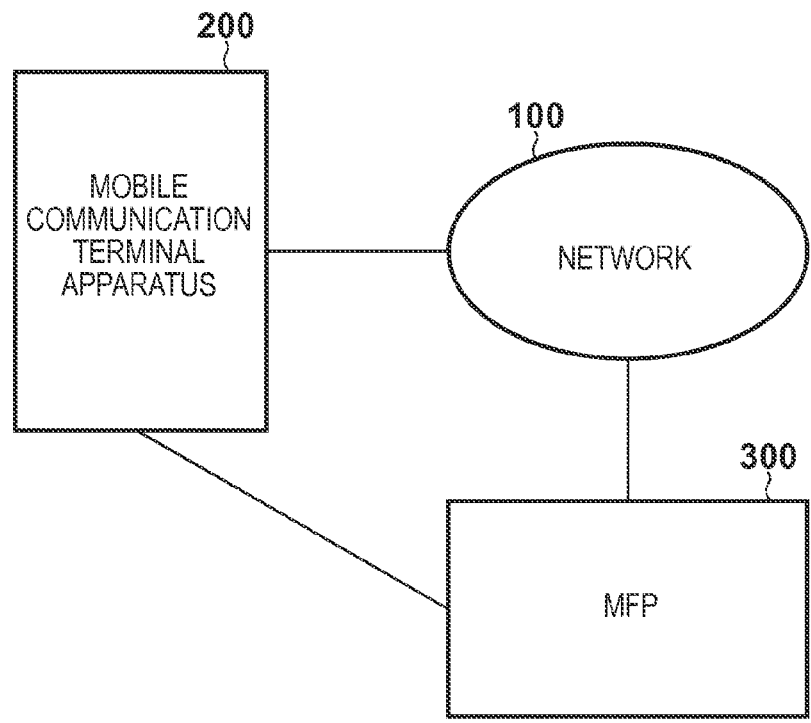
FIG. 1 is a block diagram showing the arrangement of a wireless communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

The embodiment will explain processing of, when creating a job by using a mobile communication terminal apparatus (mobile terminal), acquiring a charging table from an MFP, estimating the fee of the job, and then transmitting and executing the job, and processing of updating the charging table. The embodiment will explain an example in which NFC (Near Field Communication) is used as short-distance wireless communication. The communication may use a near field wireless communication method such as TranserJet®, other than NFC. In the embodiment, NFC is used as a communication method capable of reliably specifying a partner though the communication speed is relatively low.

FIG. 1 is a block diagram showing the arrangement of an image forming system according to the embodiment. A mobile communication terminal apparatus 200 and MFP 300 are connected to each other via a network 100 serving as the center so that they can communicate with each other. The mobile communication terminal apparatus 200 is an apparatus which can implement at least two wireless communication methods different in authentication method and communication speed. The mobile communication terminal apparatus 200 suffices to be an apparatus capable of handling a file to be printed, such as a personal information terminal (for example, PDA (Personal Digital Assistant)), a mobile phone, a digital camera, or a smartphone.

The MFP 300 has a reading function of optically reading an original set on a platen, and a printing function using a printing unit such as an inkjet printer. The MFP 300 may also have a facsimile function and telephone function. The network 100 and MFP 300 are connected by a wired LAN or wireless LAN (WLAN). The network 100 and mobile communication terminal apparatus 200 are connected by the WLAN. Both the mobile communication terminal apparatus 200 and MFP 300 have a WLAN function, and can perform peer-to-peer (P2P) communication by mutual authentication.

Figure 2:
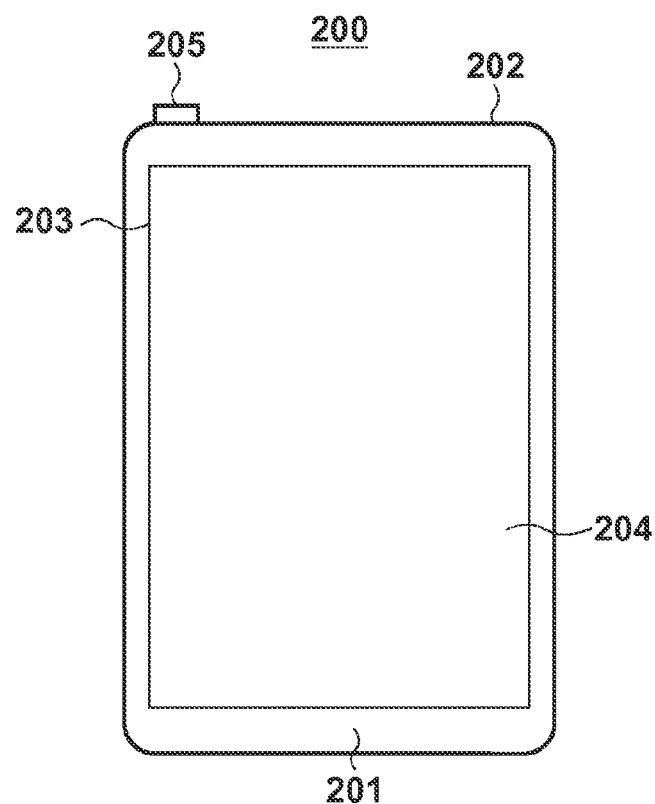
FIG. 2 is a view showing the outer appearance of a mobile communication terminal apparatus.

FIG. 2 is a view showing the outer appearance of the mobile communication terminal apparatus 200. In the embodiment, for example, a smartphone is used as the mobile communication terminal apparatus 200. The smartphone indicates a multi-function mobile phone terminal which incorporates a camera, network browser, email function, and the like in addition to the functions of a mobile phone. An NFC unit 201 is a portion for performing communication using NFC. When the user actually brings the NFC unit 201 close to a partner NFC unit within about 10 cm to touch the partner NFC unit (or just brings it close), the NFC units can communicate with each other. A WLAN unit 202 is a unit for performing WLAN communication, and is incorporated in the mobile communication terminal apparatus 200. A display unit 203 is a display having an LCD display mechanism. An operation unit 204 includes a touch-panel operation mechanism, and detects pressing of a button by the user. As a representative operation method, the display unit 203 displays software keys and the like, and when the user presses a button on the operation unit 204, an event corresponding to the pressing is issued. A power key 205 is used to turn on/off the power supply.

Figure 3A:
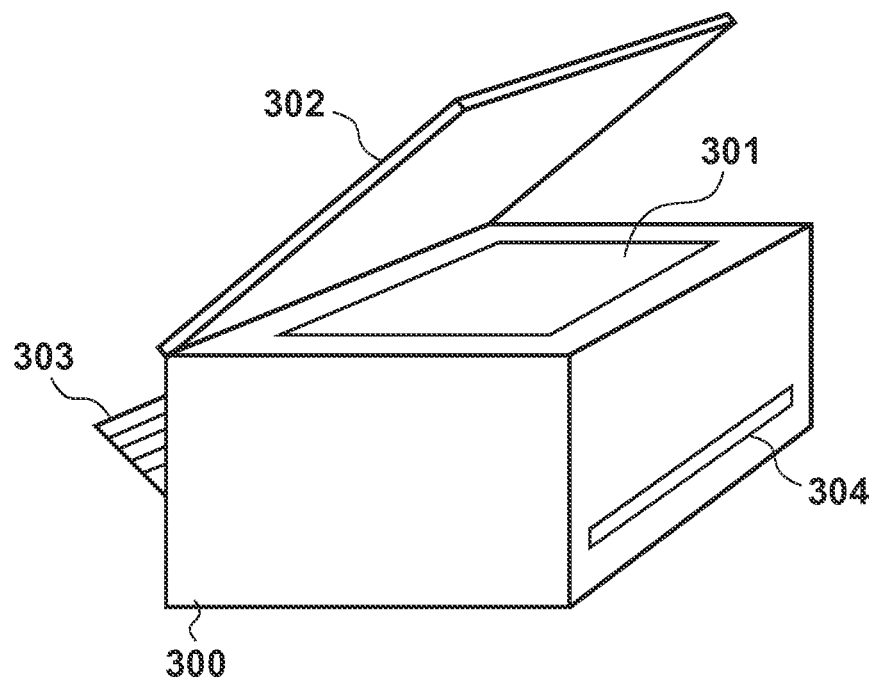
FIGS. 3A and 3B are views showing the outer appearance of an MFP.
Figure 3B:
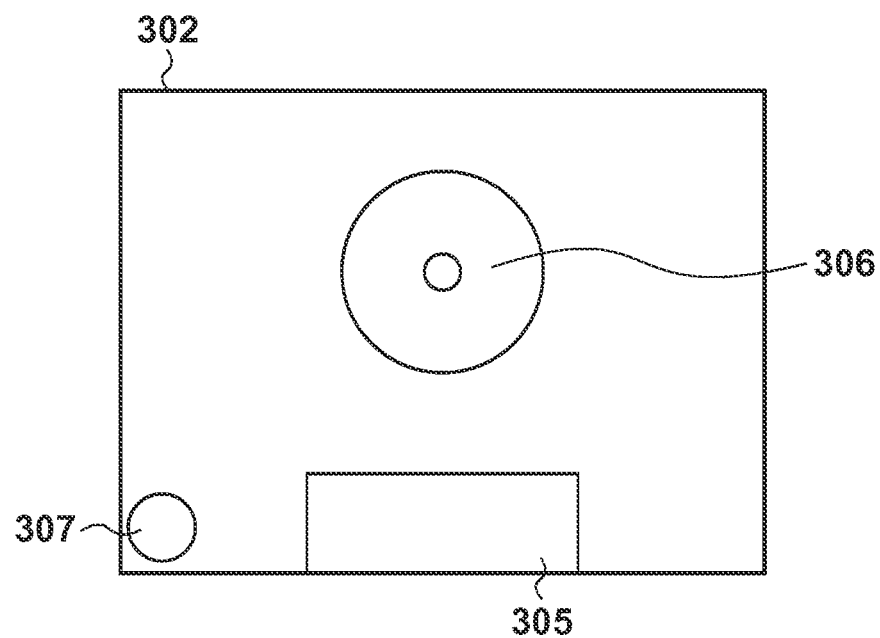

FIGS. 3A and 3B are views showing the outer appearance of the MFP 300. A platen 301 is a transparent glass table and is used to set an original on it and read the original by a scanner. An original cover 302 is a cover for preventing external leakage of reading light at the time of reading by the scanner. A printing paper insertion port 303 is an insertion port at which paper sheets of various sizes are set. Paper sheets set at the printing paper insertion port 303 are conveyed one by one to a printing unit, undergo desired printing, and are discharged from a printing paper discharge port 304. An operation/display unit 305 and NFC unit 306 are arranged at the top of the original cover 302. The operation/display unit 305 includes hardware keys such as a four-way selector key and start key, and an LCD display unit. The NFC unit 306 is a unit for performing near field wireless communication, and is a portion at which the user actually brings the mobile communication terminal apparatus 200 close to the MFP 300 and touches the MFP 300. The effective distance of contact (touch) is about 10 cm from the NFC unit 306. A WLAN antenna 307 is an antenna for performing WLAN communication.

Figure 4:
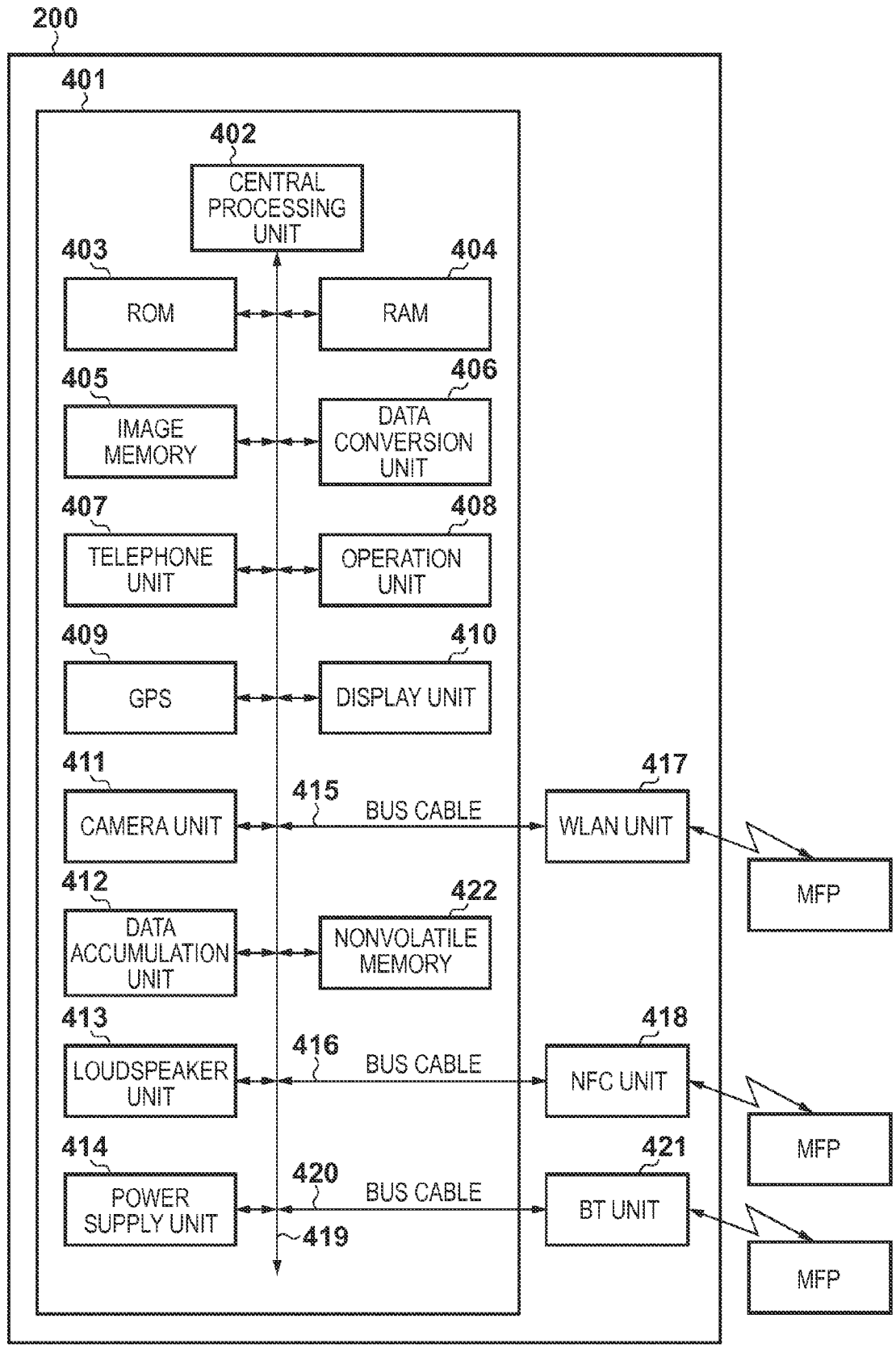
FIG. 4 is a block diagram showing the mobile communication terminal apparatus.

FIG. 4 is a block diagram showing the mobile communication terminal apparatus 200. The mobile communication terminal apparatus 200 includes a main board 401 for executing main control of the apparatus, a WLAN unit 417 for performing WLAN communication, an NFC unit 418 for performing NFC communication, and a BT unit 421 for performing Bluetooth® communication. A CPU 402 of the main board 401 is a system control unit, and controls the overall mobile communication terminal apparatus 200. A ROM 403 stores control programs to be executed by the CPU 402, an embedded operating system (OS) program, and the like. In the embodiment, the respective control programs stored in the ROM 403 perform software control such as scheduling and task switching under the management of the embedded OS stored in the ROM 403. The CPU 402 reads out a control program stored in the ROM 403 to a RAM 404 and executes it to implement an operation in the mobile communication terminal apparatus 200 according to a sequence (to be described later).

The RAM 404 is implemented by an SRAM (Static RAM) or the like, stores program control variables and the like, and also stores set values registered by the user, management data of the mobile communication terminal apparatus 200, and the like. Various work buffer areas are also allocated in the RAM 404. An image memory 405 is implemented by a DRAM (Dynamic RAM) or the like, and temporarily stores image data received via a communication unit and image data read out from a data accumulation unit 412 so as to process them by the CPU 402.

A nonvolatile memory 422 is implemented by a flash memory or the like, and stores data which needs to be saved even after power-off. In the embodiment, a charging table acquired from the MFP 300 is saved in the nonvolatile memory 422. Charging according to the embodiment is executed according to a charge method. The user holds in advance a predetermined amount of money in the mobile communication terminal apparatus 200 by using a dedicated application. When using a service, the user pays a predetermined amount of money by using the NFC unit 418. In addition, the nonvolatile memory 422 stores address book data and the like. Details of the nonvolatile memory 422 will be exemplified later with reference to FIGS. 16A and 16B.

The memory structure of the mobile communication terminal apparatus 200 is not limited to the above-described one. For example, the image memory 405 and RAM 404 may share a memory, or data may be backed up in the data accumulation unit 412. In the embodiment, a DRAM is used, but a hard disk, nonvolatile memory, or the like may be used.

A data conversion unit 406 performs analysis of a page description language (PDL) and the like, and data conversion such as color conversion and image conversion. A telephone unit 407 controls a telephone line, and implements telephone communication by processing audio data input/output via a loudspeaker unit 413. An operation unit 408 controls signals of the operation unit 204 described with reference to FIG. 2. A GPS (Global Positioning System) 409 acquires information of the current latitude and longitude of the mobile communication terminal apparatus 200, and the like. A display unit 410 electronically controls the display contents of the display unit 203 described with reference to FIG. 2, accepts various input operations, and can display the operation and status of the MFP 300 and the like.

A camera unit 411 has a function of electronically recording and encoding an image input via a lens. An image captured by the camera unit 411 is saved in the data accumulation unit 412. The loudspeaker unit 413 implements a function of inputting or outputting a speech for a telephone function, and also an alarm notification function and the like. A power supply unit 414 includes a portable battery and controls it. A power supply state includes, for example, a battery dead state in which the battery runs out, a power-off state in which the power key 205 is not pressed, an active (power-on) state in which the apparatus is active normally, and a power saving state in which the apparatus is active in the power saving mode.

The mobile communication terminal apparatus 200 can perform wireless communications by three methods: WLAN, NFC, and Bluetooth®. With arrangements for them, the mobile communication terminal apparatus 200 can perform data communication with another device such as an MFP. At the time of data communication, the mobile communication terminal apparatus 200 converts data into packets, and transmits the packets to another device. Conversely, the mobile communication terminal apparatus 200 receives packet data from another external device, converts it into processible data, and outputs the data to the CPU 402. For example, first, the mobile communication terminal apparatus 200 transmits connection information of WLAN and Bluetooth by using NFC, after ending the NFC communication, switches the communication to a relatively high-speed communication method such as WLAN or Bluetooth, and transmits image data or the like. The WLAN unit 417, NFC unit 418, and BT unit 421 are connected via bus cables or the like, respectively. The WLAN unit 417, NFC unit 418, and BT unit 421 implement wireless communication complying with the respective communication standards. Details of the NFC unit will be described later with reference to FIG. 6. The above-described building components 403 to 414, 417, 418, 421, and 422 are connected to each other via a system bus 419, and controlled by the CPU 402.

Figure 5:
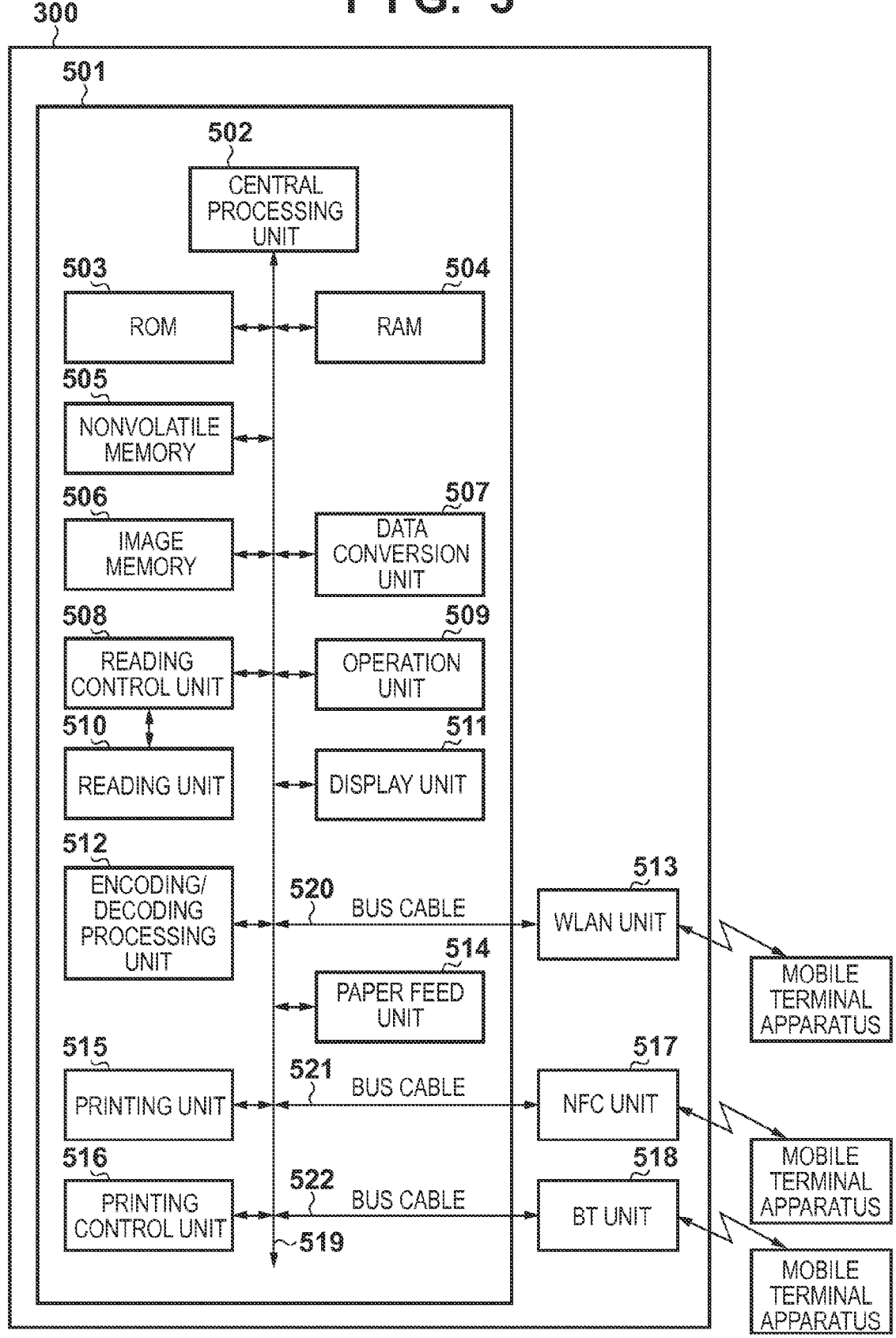
FIG. 5 is a block diagram showing the schematic arrangement of the MFP.

FIG. 5 is a block diagram showing the schematic arrangement of the MFP 300. The MFP 300 includes a main board 501 for performing main control of the apparatus, a WLAN unit 513 for performing WLAN communication, an NFC unit 517 for performing NFC communication, and a BT unit 518 for performing Bluetooth communication.

A CPU 502 of the main board 501 is a system control unit, and controls the overall MFP 300. A ROM 503 stores control programs to be executed by the CPU 502, an embedded operating system (OS) program, and the like. In the embodiment, the respective control programs stored in the ROM 503 perform software control such as scheduling and task switching under the management of the embedded OS stored in the ROM 503. The CPU 502 reads out a control program stored in the ROM 503 to a RAM 504 and executes it to implement an operation in the MFP 300 according to a sequence (to be described later). Some control programs perform charging control, and the NFC unit 517 can be used to transmit/receive control commands for charging to/from the mobile communication terminal apparatus 200.

The RAM 504 is implemented by an SRAM (Static RAM) or the like, stores program control variables and the like, and also stores set values registered by the user, management data of the MFP 300, and the like. Various work buffer areas are allocated in the RAM 504. A nonvolatile memory 505 is implemented by a flash memory or the like, and stores data which needs to be held even after power-off. Such data include, for example, network connection information and user data. Details of the nonvolatile memory 505 will be exemplified later with reference to FIG. 8. An image memory 506 is implemented by a DRAM (Dynamic RAM) or the like, and accumulates image data received via each communication unit, image data processed by an encoding/decoding processing unit 512, and the like. Also, the memory structure of the MFP 300 is not limited to the above-described one, similarly to the memory structure of the mobile communication terminal apparatus 200. For example, the image memory 506 and RAM 504 may share a memory. In the embodiment, a DRAM is used for the image memory 506, but a hard disk, nonvolatile memory, or the like may be used. A data conversion unit 507 performs analysis of a page description language (PDL) and the like, conversion from image data into print data, and the like.

A reading unit 510 optically reads an original by a CIS image sensor (Contact Image Sensor). A reading control unit 508 performs various image processes such as binarization processing and halftone processing via an image processing control unit (not shown) on an image signal obtained by converting the read original into electrical image data, and outputs high-resolution image data. An operation unit 509 and display unit 511 include various setting keys for performing an operation by the user, and an LCD for presenting a display. The encoding/decoding processing unit 512 executes encoding/decoding processing and enlargement/reduction processing for image data (for example, JPEG or PNG) to be processed by the MFP 300.

A paper feed unit 514 holds paper sheets for printing. A paper sheet is fed from the paper feed unit 514 under the control of a printing control unit 516. To hold a plurality of types of paper sheets, the paper feed unit 514 may include paper feed units capable of holding paper sheets of a plurality of sizes. The printing control unit 516 controls to select a paper feed unit to be used to feed paper sheets.

The printing control unit 516 performs, via the image processing control unit (not shown), various image processes such as smoothing processing, printing density correction processing, and color correction on image data to be printed, converts the image data into high-resolution image data, and outputs the obtained image data to a printing unit 515. The printing control unit 516 can also periodically read out information of the printing unit, and update information stored in the RAM 504. For example, the printing control unit 516 updates the remaining amount of an ink tank, a printhead nozzle state, and the like. The MFP 300 also incorporates three arrangements for performing wireless communication, as in the mobile communication terminal apparatus 200. The above-described building components 502 to 516 are connected to each other via a system bus 519, and controlled by the CPU 502.

FIG. 6 is a block diagram for explaining details of an NFC unit used as the NFC unit 418 or 517. NFC communication will be explained. When performing near field wireless communication by the NFC unit, an apparatus which first outputs an RF (Radio Frequency) field to start communication will be called an initiator. An apparatus which responds to an instruction issued by the initiator and communicates with the initiator will be called a target.

Here, a passive mode and active mode will be explained. The passive mode and active mode exist as communication modes of the NFC unit. In the passive mode, the target responds to an instruction from the initiator by performing load modulation. At this time, a current flowing to the coil of the target by an RF field generated by the initiator is used as power, so the target does not require supply of power from an AC power supply or battery. In the active mode, the target responds to an instruction from the initiator by an RF field generated by the target itself. To do this, the target requires supply of power. The active mode has a feature in which the communication speed can become higher than that in the passive mode.

The arrangement of an NFC unit 600 will be explained with reference to FIG. 6. The NFC unit 600 includes an NFC controller unit 601, antenna unit 602, RF unit 603, transmission/reception control unit 604, NFC memory 605, power supply 606, and device connection unit 607. The antenna unit 602 receives radio waves or carriers from another NFC device, or transmits radio waves or carriers to another NFC device. The RF unit 603 has a function of modulating/demodulating an analog signal into a digital signal. The RF unit 603 includes a synthesizer. The RF unit 603 identifies band and channel frequencies, and controls the band and channel based on frequency allocation data. The transmission/reception control unit 604 performs control regarding transmission/reception, such as assembly and disassembly of a transmission/reception frame, addition and detection of a preamble, and frame identification. The transmission/reception control unit 604 also controls the NFC memory 605, and reads/writes various data and programs from/in the NFC memory 605.

When the NFC unit 600 operates in the active mode, it receives supply of power via the power supply 606. The NFC controller unit 601 communicates with the main body via the device connection unit 607 or communicates with another NFC device falling within a communicable range by using carriers transmitted/received via the antenna unit 602. When the NFC unit 600 operates in the passive mode, it receives carriers from another NFC device via the antenna unit 602, receives supply of power from another NFC device by electromagnetic induction, and transmits/receives data to/from the other NFC device by carrier modulation. With this arrangement, even when the MFP 300 is in, for example, the power saving state or power-off state, the mobile communication terminal apparatus 200 and MFP 300 can mutually transmit/receive data and the like in the NFC memory 605.

Figure 7A:
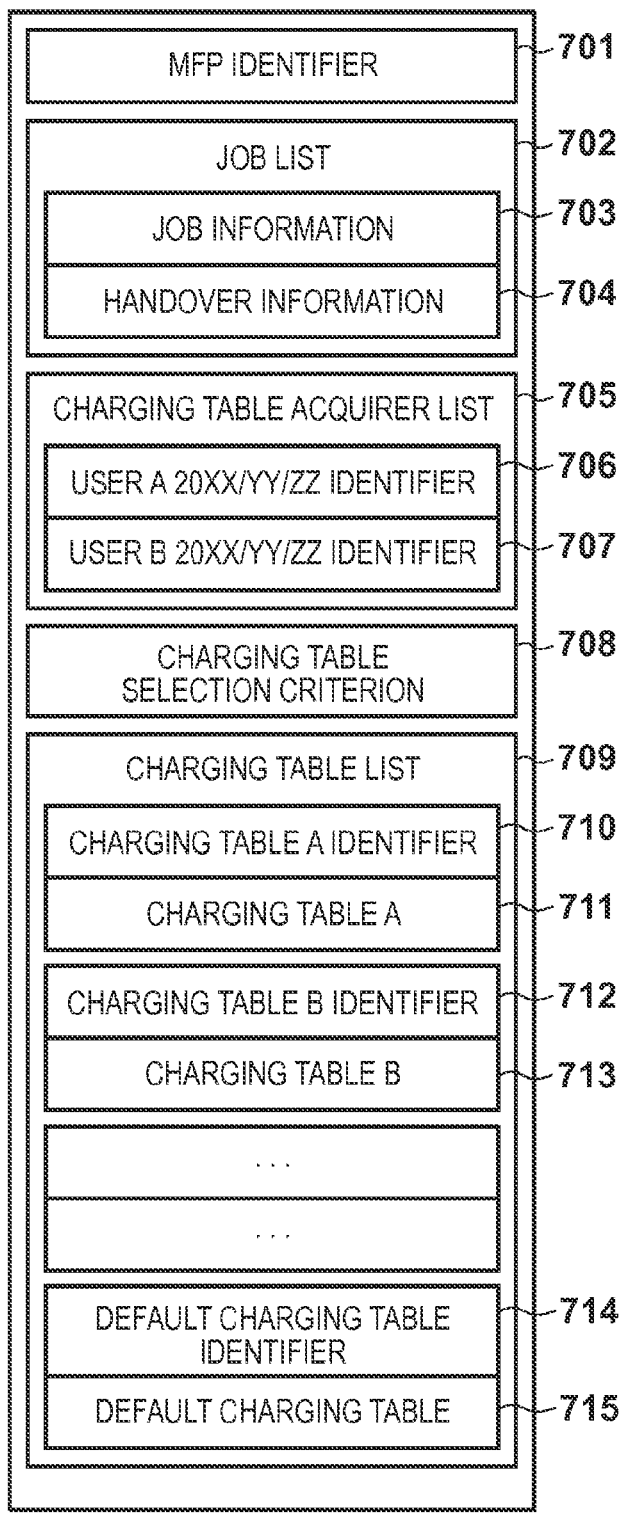
FIGS. 7A and 7B are views each showing the internal structure of the NFC memory of the MFP.
Figure 7B:
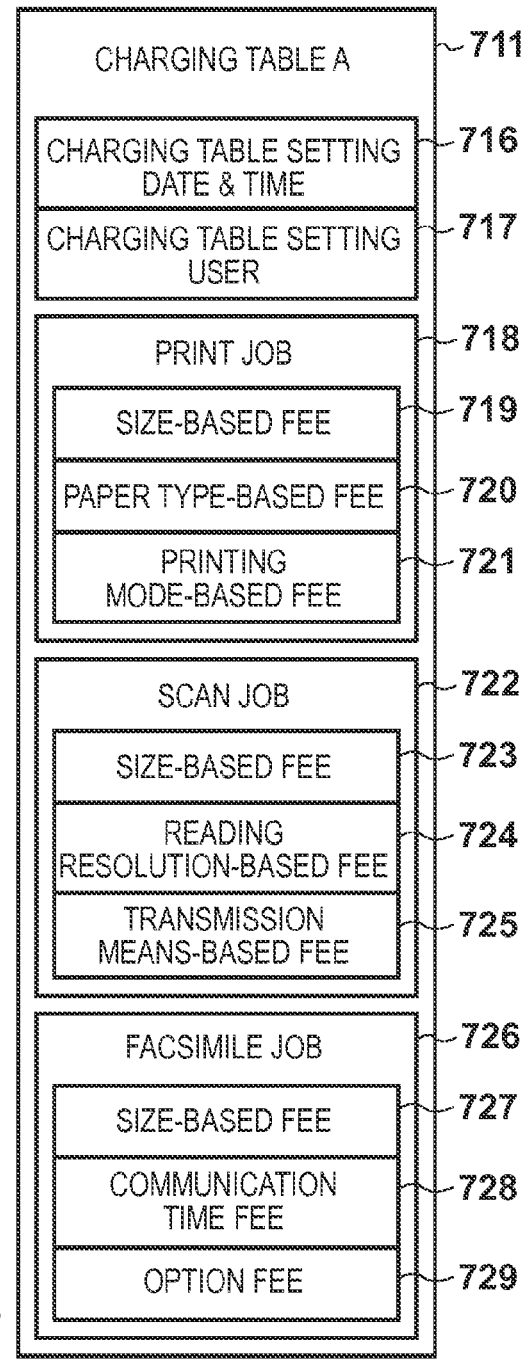

FIGS. 7A and 7B are views showing the internal structure of the NFC memory 605 of the MFP. FIG. 7A shows the overall NFC memory 605. FIGS. 7A and 7B show only items necessary to explain an operation in the embodiment, out of pieces of information stored in the NFC memory 605. In practice, the NFC memory 605 stores even other items such as a file system and security information. FIG. 7B is a view showing details of a charging table A 711. A charging table B 713 and other charging tables also have the same structure.

An MFP identifier 701 is an ID for uniquely specifying an MFP. For example, the serial number of an apparatus, or a number uniquely determined in a charging service system according to the embodiment is held as apparatus-specific information. The mobile communication terminal apparatus 200 can uniquely recognize a communication partner MFP by using the MFP identifier 701. A job list 702 is a location where a job transmitted from the mobile communication terminal apparatus 200 is stored. The job list 702 includes job information 703 and handover information 704. For example, for a print job, the job information 703 designates the size and type of paper, an image file, image correction information, and the like. Based on this information, the MFP 300 can decide contents to be printed. The handover information 704 stores the storage destination of an image file. The size of an image file or the like to be used for a job is sometimes large. In this case, according to the handover method, first, setting information about a job and information of a connection to an image file storage destination are transmitted by a relatively low-speed near field wireless communication method such as NFC. Then, the communication is switched to a relatively high-speed communication method such as WLAN or Bluetooth.

A charging table acquirer list 705 holds, as a list, the history of users who acquired a charging table. The list stores, for example, a user name, acquisition date & time, and identifier set in the mobile communication terminal apparatus 200. The identifier is information capable of uniquely specifying the mobile communication terminal apparatus 200. The identifier is, for example, a serial number or the telephone number of the mobile communication terminal apparatus 200.

An algorithm to select a charging table matching a user is executed using a charging table selection criterion 708, charging tables such as 710, 712, and 714, and a specific information identifier 1600. The specific information identifier 1600 is an identifier (identification information) which is stored in the ROM 403 of the mobile communication terminal apparatus 200 and is used as a criterion in charging. The specific information identifier 1600 includes a department ID, user ID, application ID, and coupon ID. This structure makes it possible to assign a different charging table in accordance with each user, each department, or the presence/absence or type of a coupon. Details of this will be described later with reference to FIGS. 17A and 17B, and an outline will be explained here.

The charging table selection criterion 708 stores information about a criterion used to select a charging table. For example, pieces of information such as "department ID=2", "user ID=0", "application ID=1", and "coupon ID=0" are stored. At this time, a charging table matching a condition is selected based on items other than those having a figure "0". The criterion of an item having a large figure is employed preferentially.

A charging table list 709 stores, as a list, charging tables serving as selection candidates. Each charging table is associated with a charging table identifier. The charging table identifier is formed from a figure in a plurality of digits such as "1*_**_000*_****", in which "*" is a wild card. Items are assigned to every four digits out of the 16 digits, and the respective items represent a department ID, user ID, application ID, and coupon ID, respectively. In the default charging table identifier 714, a special value clarifying a default, such as "0000_0000_0000_0000", is stored. A default charging table 715 is a charging table used when, for example, a charging table matching a condition is not detected.

FIG. 7B is a view showing the charging table A 711 serving as an example of the charging table. As shown in FIG. 7B, charging setting conditions are stored for respective job types such as printing, scanning, and facsimile. In a charging table setting date & time 716, the date & time when the charging table was set is stored. In a charging table setting user 717, the name of a user who set the charging table is stored. In a size-based fee 719 of a print job 718, information which is a charging table specific to the size of paper to be printed and represents, for example, A4=¥10 and A3=¥30 is stored. In a paper type-based fee 720, information which is a charging table specific to the type of paper to be printed and represents glossy paper=1.5-fold, plain paper=1.0-fold, and recycled paper=0.8-fold is stored. In a printing mode-based fee 721, information which indicates additional fee settings for various printing modes and represents fine mode=double, face brightening correction=¥10, and stapling=¥5 is stored. For example, when printing on A3 glossy paper with face brightening correction is performed, the charging amount is calculated to be ¥30×1.5+¥10=¥55.

A size-based fee 723 of a scan job 722 is the same as that for the print job. In a reading resolution-based fee 724, information which is a charging table set for each resolution of scanning, and represents 75 dpi=0.5-fold, 300 dpi=1.0-fold, and 600 dpi=2.0-fold is stored. In a transmission means-based fee, the fee is determined based on how to transmit a scanned image. For example, the fee is determined to be ¥0 for a memory card brought by the user, ¥5 for transmission by email, and ¥100 when a CD medium provided by a store in which an MFP is installed is used. For example, when A3 paper is scanned at 75 dpi and the data is transmitted to a desired address by email, the charging amount is calculated to be ¥30×0.5+¥5=¥20.

A size-based fee 727 of a facsimile job 726 is also the same as that for the print job and scan job. In a communication time fee 728, information such as ¥10/min is stored. In an option fee 729, information represents retransmission setting=¥5 and broadcast setting=¥5 is stored. For example, when five A4 facsimile original sheets are transmitted, it takes 3 min, and retransmission setting is made, the charging amount is calculated to be ¥10×5 sheets+¥10×3 min+¥5=¥85.

The mobile communication terminal apparatus 200 appropriately acquires, by NFC communication, information about a charging table in the NFC memory 605 of the MFP 300 shown in FIGS. 7A and 7B. The mobile communication terminal apparatus 200 saves, as a list, the acquired information about the charging table in the nonvolatile memory 422 of the mobile communication terminal apparatus 200. The number of charging tables which can be held can be set in accordance with the capacity of the nonvolatile memory 422. Details of the nonvolatile memory 422 will be described with reference to FIGS. 16A and 16B.

Figure 8:
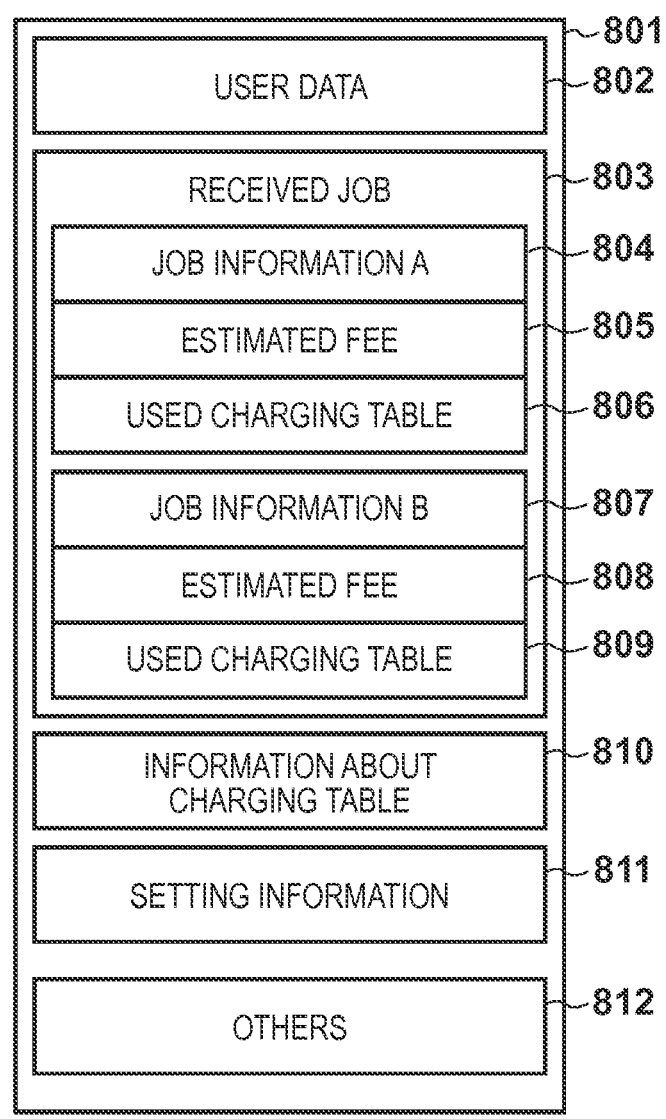
FIG. 8 is a view showing the internal structure of the nonvolatile memory of the MFP.

FIG. 8 is a view showing the internal structure of a nonvolatile memory 801 in the MFP. In user data 802, information about a user is stored, and for example, setting information, FAX, a telephone number, a communication history, and network information are stored. A job transmitted after making an estimate in the mobile communication terminal apparatus 200 is received by the MFP 300 and stored in a received job 803. In job information A 804, settings, images, a transmission destination, and the like for a job are stored. In an estimated fee 805, a fee estimated by the mobile communication terminal apparatus 200 is stored. In a used charging table 806, the charging table ID of a charging table used in estimation is stored. In information 810 about a charging table, the same pieces of information as those described for the MFP identifier 701 to option fee 729 in FIG. 7B are stored. When a charging table is transmitted/received by a communication method other than NFC or the CPU 502 updates a charging table, information stored in the nonvolatile memory 801 shown in FIG. 8 is used. In setting information 811, information about the settings of the MFP 300 is stored.

Next, FIGS. 16A and 16B will be explained. In FIG. 16A, a portion regarding an operation according to the embodiment is particularly extracted from the internal structure of the nonvolatile memory of the mobile communication terminal apparatus 200. The specific information identifier 1600 is an identifier (identification information) serving as a criterion in charging, and includes, for example, a department ID 1601, user ID 1602, application ID 1603, and coupon ID 1604. This structure makes it possible to assign a different charging table for each department or each user. For example, the charging amount can be changed depending on the post in a company, the charging amount is changed between a teacher and a student in school, or a small fee is assigned to only department A and department B. As the application ID, a different ID is assigned to, for example, each printing application of the mobile communication terminal apparatus 200, and when a specific application is used, the charging amount can be discounted. For example, for the ID of an application provided by the manufacturer of the MFP 300, a table is created so that the charging amount becomes smaller than that for another application.

The coupon ID 1604 can implement a special fee applied only when, for example, the user answers a specific questionnaire, or a special discount coupon added when a specific article is purchased. Note that various IDs as described above are not always stored in the mobile communication terminal apparatus 200. For example, only the department ID may be stored. Only when the user gets a coupon, the coupon ID is stored.

MFP charging information A 1605 is an area in which charging information acquired from the MFP 300 is stored as an acquisition history. As shown in FIG. 16B, the MFP charging information A 1605 includes an MFP identifier 1606 of an MFP which acquired the information, a charging table selection criterion 1607, a charging table A identifier 1608, a charging table A 1609, and an acquisition date 1610. In this manner, the MFP charging information A 1605 acquired once is stored as a list in the mobile communication terminal apparatus 200. Even when acquisition of a charging table from the MFP 300 fails, the charging amount can be calculated based on a charging table acquired in the past.

Next, an algorithm to select a charging table based on three parameters, that is, the specific information identifier 1600, charging table selection criterion 708, and charging table A identifier 710 will be explained using five examples with reference to FIGS. 17A and 17B. In the embodiment, the charging table selection criterion is implemented by a 4-digit numerical value. However, the number of digits may be changed or the match determination method may be changed in accordance with the use form by the user. In the example of FIG. 17A, the 4-digit numerical value is "1000", to which "department ID", "user ID", "application ID", and "coupon ID" are assigned in order. In the 4-digit numerical value, the digit of a figure other than 0 is considered, and a digit having a larger figure is considered more preferentially. Hence, the charging table selection criterion "1000" in FIG. 17A represents that only the department ID is considered. The charging table selection criterion "1002" in FIG. 17B represents that the coupon ID is considered with top priority and the department ID is considered with second priority.

The charging table identifier is formed from a 16-digit figure. For example, the charging table A identifier is "1*___**", in which "*" is used as a wild card. This indicates that charging table A is applied to a user having a department ID "1*". More specifically, the department ID in example 1 of the specific information identifier is "1567", so charging table A is applied. The charging table B identifier is "2*_**__**". This indicates that charging table B is applied to a user having a department ID "2\*\*\*". More specifically, the department ID in example 2 of the specific information identifier is "2567", so charging table B is applied.

In example 3 of the specific information identifier, first, when it is determined whether there is a charging table identifier matching the coupon ID, it is found out that there is no such charging table identifier. Note that an ID "0000" may represent that an identifier corresponding to this ID does not exist. For example, a coupon ID "0000" may indicate that the mobile information processing terminal has not acquired a coupon. When the mobile information processing terminal acquires a coupon, the coupon ID of the specific information identifier is updated by the ID of this coupon.

Then, it is determined whether there is a charging table identifier matching the department ID. Since the department ID in example 3 of the specific information identifier is "1567", charging table A is applied. In example 4 of the specific information identifier, first, it is determined whether there is a charging table identifier matching the coupon ID. Since the coupon ID in example 4 of the specific information identifier is "9999", charging table B is applied. In example 5 of the specific information identifier, first, when it is determined whether there is a charging table identifier matching the coupon ID, it is found out that there is no such charging table identifier. Then, when it is determined whether there is a charging table identifier matching the department ID, it is found out that there is no such charging table identifier. Since neither the user ID nor application ID is considered, it is found out that there is no matching charging table. In this case, the default charging table 715 is applied.

Note that the administrator of the MFP can freely change the settings of the charging table selection criterion 708 and charging table list 709. At the time of changing the settings, the settings need to be changed so that a unique charging table can be acquired for a job to be executed by the user of the mobile communication terminal apparatus 200. However, for example, when the administrator may set a set value at which two or more charging tables hit owing to a setting error or the like, the administrator of the MFP may be notified that the change of the setting has a problem, or a default charging table may be applied. As the program of the MFP, the MFP may have a function of checking whether a matching charging table is unique.

In the embodiment, by executing the above-described charging table selection algorithm, the user can immediately know a charging table matching his condition, out of a plurality of charging tables.

Figure 9:
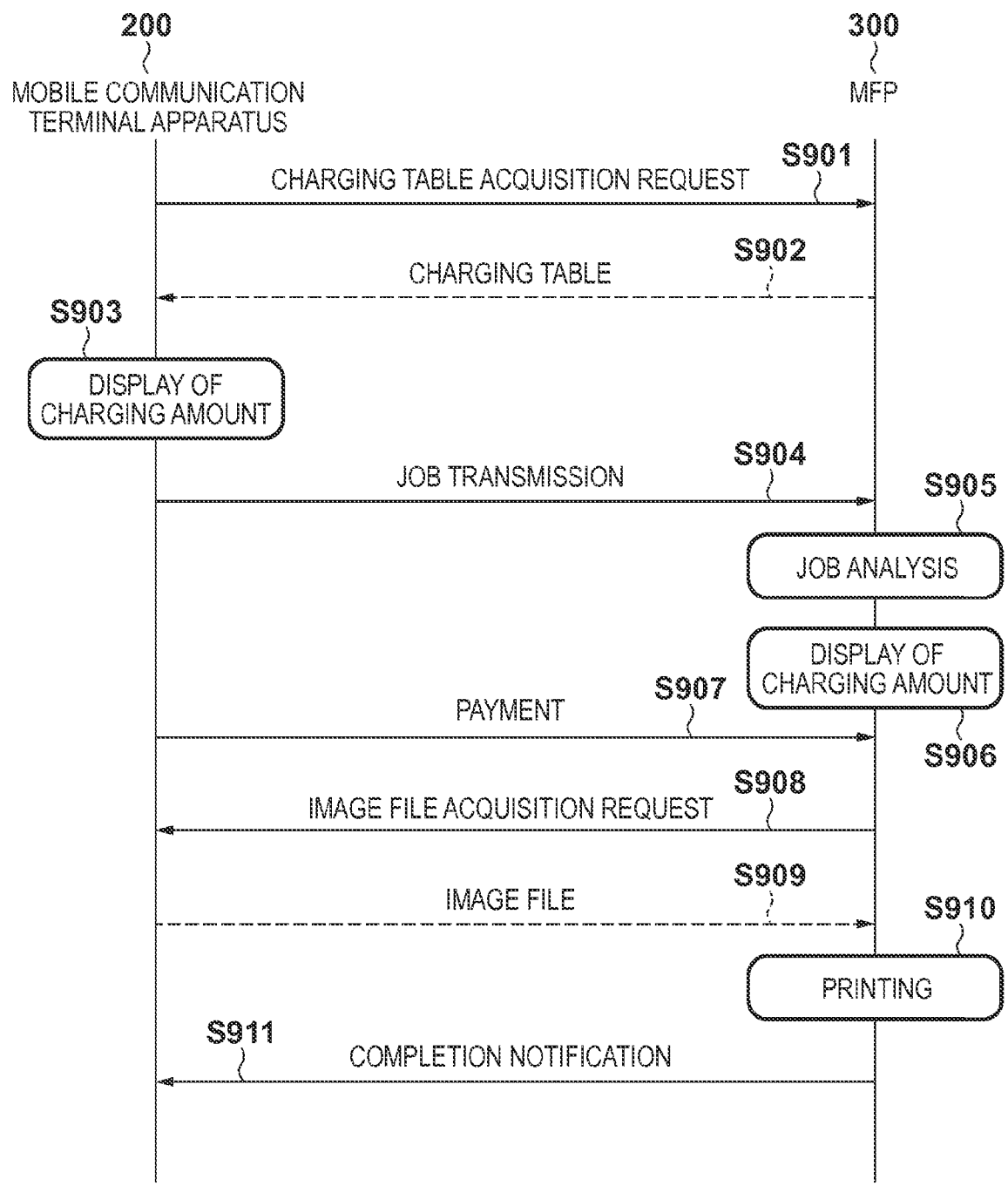
FIG. 9 is a chart showing a sequence until a print job is executed.

FIG. 9 is a chart showing a sequence until a print job is executed after the mobile communication terminal apparatus 200 acquires a charging table from the MFP 300. Note that the ROM 403 of the mobile communication terminal apparatus 200 and the ROM 503 of the MFP 300 store programs corresponding to processes by the mobile communication terminal apparatus 200 and MFP 300 in the sequences of FIG. 9 and FIG. 10 (to be described later), respectively. The processes shown in FIGS. 9 and 10 are implemented by executing the programs in the RAMs 404 and 504 by the CPU 402 of the mobile communication terminal apparatus 200 and the CPU 502 of the MFP 300, respectively.

When the NFC unit operates as a target in the passive mode of NFC, an initiator reads out data from the memory of the NFC unit serving as the target or writes it, and data can be communicated even without the operation of the CPU.

In step S901, the mobile communication terminal apparatus 200 transmits a charging table acquisition request via NFC communication to the MFP 300 which is to execute a job. In step S901, the mobile communication terminal apparatus 200 transmits the specific information identifier 1600 to the MFP 300 together with (or contained in) the charging table acquisition request. In step S902, the MFP 300 transmits a charging table to the mobile communication terminal apparatus 200. In the example of FIG. 9, the MFP 300 selects, by the processing shown in FIGS. 17A and 17B, a charging table corresponding to the specific information identifier 1600 acquired in step S901. Then, the MFP 300 transmits the selected charging table to the mobile communication terminal apparatus 200. The advantage of using NFC communication is that the communication range is limited to a short distance in NFC, and the MFP 300 in front can be reliably designated without any prior complicated communication setting. In step S902, the mobile communication terminal apparatus 200 acquires a charging table in the NFC memory 605 of the MFP 300.

In step S903, the mobile communication terminal apparatus 200 displays a charging amount on the display unit 410 by using the acquired charging table. FIGS. 14A to 14D show examples of a screen displayed on the display unit 410 at this time. When a job is created before executing step S901, the screen is displayed as shown in FIG. 14A. This screen represents that the created job is displayed on the list, but the charging amount is not known yet. If steps S901, S902, and S903 are executed in this state, a screen in FIG. 14B is displayed. Before creating a job, steps S901 and S902 may be executed. In this case, the screen in FIG. 14A is not displayed, and the screen in FIG. 14B is displayed after creating a job.

If the user confirms the charging amount displayed in step S903 and determines to execute the job, the mobile communication terminal apparatus 200 transmits the job to the MFP 300 in step S904. At this time, NFC communication is also used to transmit a job. Since the communication speed in NFC communication is relatively low, setting information about the job is transmitted, but the image file itself is not transmitted. The MFP 300 analyzes the received job in step S905, and displays the charging amount in step S906. The user confirms the displayed charging amount and then executes a fee payment operation in step S907. Electronic money may be used for the payment operation, or another payment operation such as payment by card may be executed. When electronic money is used, charging processing may be executed by performing NFC communication between the mobile communication terminal apparatus 200 and the MFP 300.

Upon completion of the payment operation, the MFP 300 acquires an image file described in the setting information about the job in step S908. This example is explained on the assumption that an image file exists in the mobile communication terminal apparatus 200. However, an image file may exist in a storage location accessible by the MFP 300, such as an external server. The MFP 300 transmits an image file acquisition request in step S908, and acquires the image file in step S909. After that, the MFP 300 prints in step S910, and transmits a printing completion notification to the mobile communication terminal apparatus 200 in step S911. Thereafter, the sequence ends.

By executing the sequence described with reference to FIG. 9, the user can reliably designate an arbitrary MFP, confirm a fee necessary for a job in advance, and then execute printing. In the description of FIG. 9, the MFP 300 selects a charging table matching the specific information identifier 1600 of the mobile communication terminal apparatus 200. However, the present invention is not limited to this, and the mobile communication terminal apparatus 200 may acquire a plurality of charging tables and a charging table selection criterion from the MFP 300, and select, from these charging tables, a charging table matching the specific information identifier 1600 of the mobile communication terminal apparatus 200. In this case, the MFP 300 can store the plurality of charging tables and the table selection criterion in the NFC memory 605 of the MFP 300, as shown in FIGS. 7A and 7B. When the NFC unit operates as a target in the passive mode of NFC, data can be transmitted/received without supplying power from an AC power supply or battery. For example, even when the MFP 300 is in the power-off or power saving state and no power is supplied to the NFC unit 517, the mobile communication terminal apparatus 200 can acquire a charging table without waiting for activation of the MFP 300, details of which will be described later with reference to FIG. 10. According to this sequence, NFC communication is performed twice for the job transmission in step S904 and the payment in step S907. However, NFC communication may be executed once so that the payment is made at the same time as job transmission.

FIG. 10 is a chart for explaining processing of selecting a charging table matching a condition from a plurality of charging tables by the mobile communication terminal apparatus 200. The method of acquiring a charging table by the mobile communication terminal apparatus 200 changes depending on whether the MFP 300 is in the power-off or power saving state, or whether the MFP 300 is in the power-on state. When the MFP 300 is in the power-off or power saving state, the mobile communication terminal apparatus 200 sequentially acquires charging tables from the MFP 300 and determines whether each charging table matches a condition.

First, a case in which the MFP 300 is in the power-off or power-saving state will be explained. In this case, no power is supplied to the NFC unit 517 of the MFP 300, and the NFC unit 517 operates as a target. The mobile communication terminal apparatus 200 transmits in step S1001 a request to acquire the charging table selection criterion 708, and acquires the charging table selection criterion 708 in step S1002. By acquiring the charging table selection criterion 708, the mobile communication terminal apparatus 200 can know a criterion for selecting a charging table. The mobile communication terminal apparatus 200 transmits a charging table acquisition request in step S1003, and acquires a charging table identifier and charging table in step S1004.

The mobile communication terminal apparatus 200 acquires the charging table A identifier 710, and determines in step S1005 whether the charging table A 711 matches the charging table selection criterion 708 and the condition of the specific information identifier 1600. If the mobile communication terminal apparatus 200 determines that the charging table A 711 matches the charging table selection criterion 708 and the condition of the specific information identifier 1600, it displays a charging amount based on the charging condition (for example, the item 719 in FIG. 7B) of charging table A in step S1006. If the mobile communication terminal apparatus 200 determines that the charging table A 711 does not match the charging table selection criterion 708 and the condition of the specific information identifier 1600, it acquires again the charging table B identifier 712 and charging table 713 in step S1003. Subsequently, the mobile communication terminal apparatus 200 repeats steps S1003 to S1005 until a matching charging table is acquired. Since only one charging table should match the condition, the repeat of steps S1003 to S1005 may be stopped when a matching charging table is detected. However, two or more charging tables may match the condition owing to a setting error of the administrator of the MFP. Considering this, all charging tables held in the MFP may be acquired to make the determination in step S1005.

With this arrangement, even when the MFP 300 is in the power-off or power saving state, the mobile communication terminal apparatus 200 can acquire a charging table from the MFP 300, and need not wait for activation of the MFP 300. Further, when the user does not want printing as a result of confirming a charging amount in step S1006, the MFP 300 need not be activated wastefully.

Next, a case in which the power supply of the MFP 300 is ON will be explained. In step S1015, simultaneously when transmitting a charging table acquisition request to the MFP 300, the mobile communication terminal apparatus 200 also transmits the specific information identifier 1600. Then, the MFP 300 selects a table matching the condition of the specific information identifier 1600 in step S1016, and transmits the charging table to the mobile communication terminal apparatus 200 in step S1017. Subsequent steps S1007 to S1014 are the same as those in FIG. 9.

As described above, by executing the sequence of FIG. 10, a charging table matching a condition can be selected from a plurality of charging tables. Even when the MFP 300 is in the power-off or power-saving state, the mobile communication terminal apparatus 200 can quickly acquire a matching charging table, and the user can immediately determine whether to execute a job.

Note that the MFP 300 takes the power-on state and power-off state, as shown in FIG. 10, and which of the power-on and power-off states is taken may be determined by various methods. For example, when the MFP 300 changes to the power-off or power saving state, information representing that the MFP 300 changes to this state is stored in the memory of the NFC unit 517. When the mobile communication terminal apparatus 200 acquires this information from the NFC unit 517, it may acquire a plurality of charging tables and a charging table selection criterion from the MFP 300.

In step S1015 of FIG. 10, the mobile communication terminal apparatus 200 may transmit a charging table selection request to the MFP 300, and the MFP 300 may select a charging table in step S1016 in response to this request and transmit it in step S1017. If the MFP 300 is in the power-off or power saving state, selection of a charging table is not performed, and thus a selected charging table is not transmitted to the mobile communication terminal apparatus 200. On condition that a selected charging table is not transmitted, it can be determined that the MFP 300 is in the power-off or power saving state.

A sequence in the mobile communication terminal apparatus 200 when the power supply of the MFP 300 is OFF in FIG. 10 will be explained with reference to FIGS. 11A and 11B. The process starts from step S1100. In step S1101, the user activates a printing application in the mobile communication terminal apparatus 200 and creates a print job (job), and the process advances to step S1102. In step S1102, the user changes the printing application to a charging table acquisition mode, and the process advances to step S1103. In step S1103, the charging table selection criterion 708 is acquired from the MFP 300, and the process advances to step S1104. In step S1104, it is determined whether the charging table selection criterion 708 has been acquired. If it is determined that the charging table selection criterion 708 has not been acquired, the process advances to step S1110. If it is determined that the charging table selection criterion 708 has been acquired, the process advances to step S1105.

In step S1105, the specific information identifier 1600 matching the contents of the charging table selection criterion 708 is specified. For example, when the charging table selection criterion 708 is "1000", the department ID 1601 in the specific information identifier 1600 is specified. In step S1106, a charging table identifier is acquired from the MFP 300, and the process advances to step S1107. In step S1107, it is determined whether the charging table identifier has been acquired. If it is determined that the charging table identifier has not been acquired, this indicates that there is no matching charging table, and the process advances to step S1110. If it is determined that the charging table identifier has been acquired, the process advances to step S1108.

In step S1108, whether the specific information identifier 1600 matches the condition of the charging table identifier is determined using the algorithm described with reference to FIGS. 17A and 17B. If it is determined that the specific information identifier 1600 does not match the condition, the process returns to step S1106 to acquire again the next charging table identifier. If it is determined that the specific information identifier 1600 matches the condition, this indicates that the charging table has been selected, and the process advances to step S1109. In step S1109, the matching charging table is acquired, and the process advances to step S1111. In step S1110, a default charging table is acquired, and the process advances to step S1111. Here, the acquired charging table is, for example, the charging table A 711, and the default charging table is the default charging table 715. As described in regard to steps S1003 to S1005 of FIG. 10, only one charging table should match the condition, so the process may shift to step S1109 if the specific information identifier 1600 matches the condition in step S1108. However, two or more charging tables may match the condition owing to a setting error by the administrator of the MFP. Considering this, the loop of steps S1106 to S1108 may be repeated until all charging tables held in the MFP are acquired.

In step S1111, it is determined whether the charging table has been acquired. If it is determined that the charging table has been acquired, the process advances to step S1112. If it is determined that the charging table has not been acquired, the process advances to step S1113. In step S1112, it is determined whether the charging table acquired from the MFP 300 having the same identifier as the MFP identifier 1606 is newer than a charging table held in the nonvolatile memory 422. If it is determined that the acquired charging table is newer, the process advances to step S1114 to update the MFP charging information 1605 by the acquired charging table.

In step S1117, the acquired charging table is displayed on the display unit 410, and the process advances to step S1118. The processing in step S1117 may be skipped depending on the user setting. In step S1118, the charging amount of the job list is calculated, and the process advances to step S1119. The charging amount is calculated by a method as described with reference to FIGS. 7A and 7B. In step S1119, it is determined whether the charge amount of electronic money is enough for the charging amount. If it is determined that the charge amount of electronic money is enough, the process advances to step S1120. If it is determined that the charge amount of electronic money is short, the process advances to step S1121.

FIG. 14B shows an example of a display in step S1120. FIG. 14C shows an example of a display in step S1121. The sequence of steps S1122 to S1124 is the same as the sequence described in steps S1007 to S1012.

When the shortage situation is displayed in step S1121, it may be controlled not to perform job transmission in step S1122. More specifically, the processing may be performed to return from step S1122 to step S1119. After it is confirmed in step S1119 that the charge amount is enough, job transmission in step S1122 may be performed.

As another example, when the charge amount is short as in step S1121, the MFP 300 may print up to a stage corresponding to the paid fee in step S1123. For example, it is also possible to make determination for each page, and print up to a page corresponding to the paid fee.

If it is determined in step S1111 that the charging table has not been acquired, it is determined in step S1113 whether the mobile communication terminal apparatus 200 holds a charging table corresponding to the MFP 300 which is to execute the job. If it is determined that the mobile communication terminal apparatus 200 holds a corresponding charging table, the process advances to step S1115. If it is determined that the mobile communication terminal apparatus 200 does not hold a corresponding charging table, the process advances to step S1116. In step S1115, the held charging table is used and displayed on the display unit 410, as shown in FIG. 14D, and the process advances to step S1117. In step S1116, the display unit 410 displays a message that charging information has not been acquired. Then, the process advances to step S1125, ending this processing.

Figure 11A:
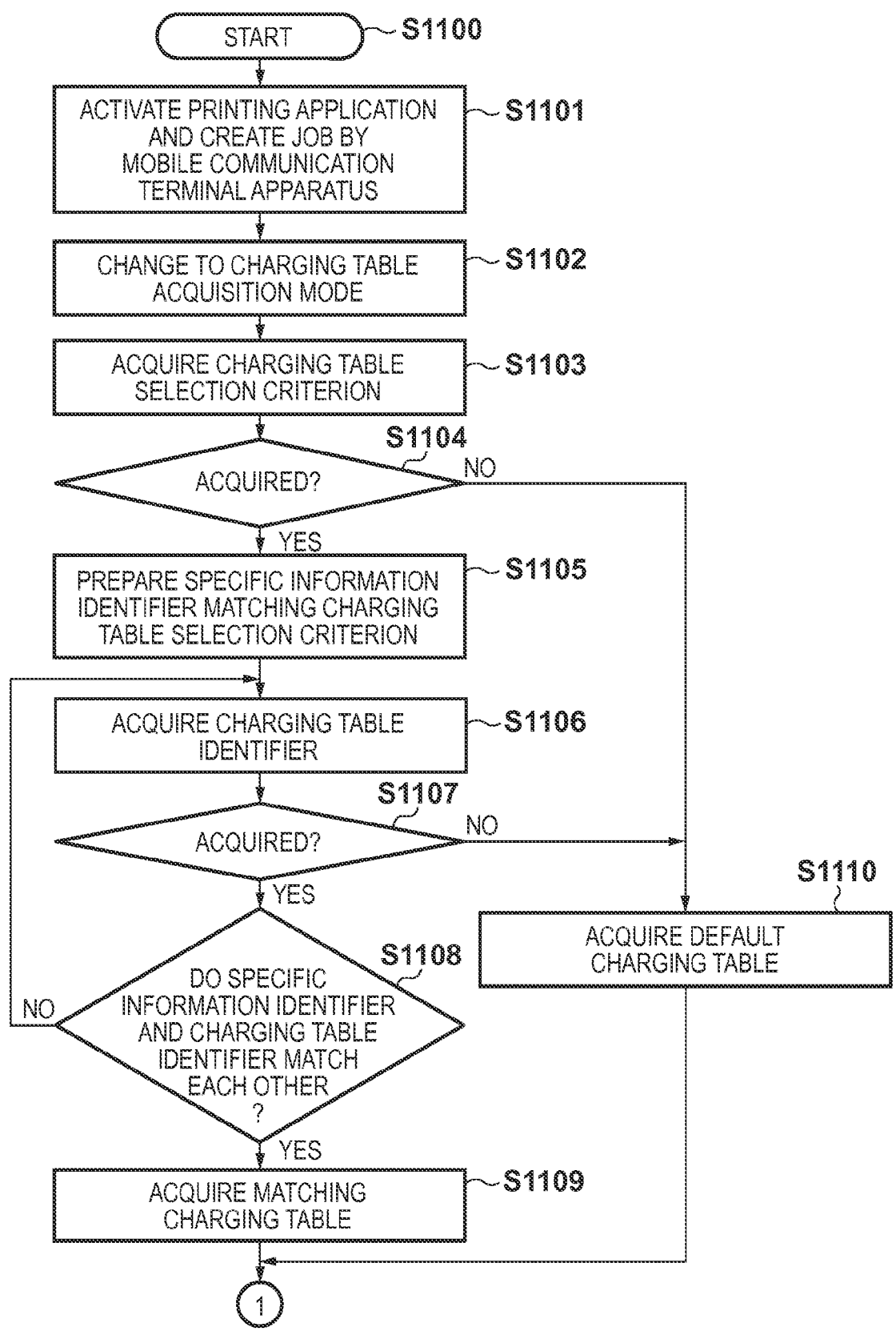

By executing the sequence shown in FIGS. 11A and 11B, the user of the mobile communication terminal apparatus 200 can acquire a charging table held in the NFC memory and quickly know a charging amount even when he wants to use the MFP 300 in the power-off or power saving state. If there is no charging table matching the condition of the mobile communication terminal apparatus 200 of the user, a default charging table is used, so the possibility at which calculation of a charging amount fails can be decreased. Even when acquisition of a charging table fails, if there is a previously acquired charging table, this charging table can be used to increase the possibility at which charging information can be presented to the user.

Figure 12:
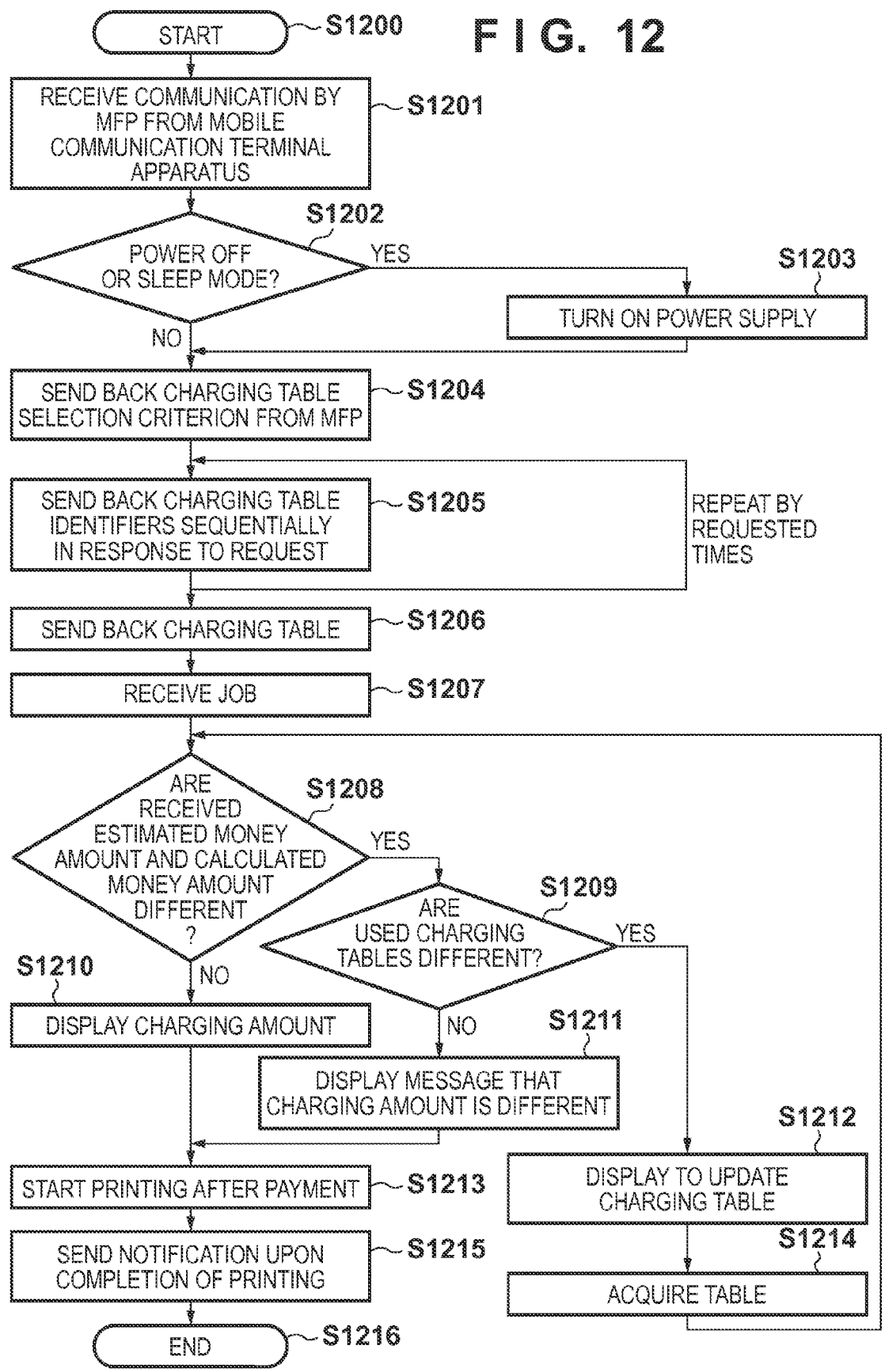
FIG. 12 is a flowchart for explaining a sequence in the MFP.

A sequence in the MFP 300 when the power supply of the MFP 300 is OFF in FIG. 10 will be explained with reference to FIG. 12. This sequence shows an example in which the MFP 300 is activated in response to a request from the mobile communication terminal apparatus 200. The process starts from step S1200. In step S1201, the NFC unit 517 of the MFP 300 detects a communication signal from the mobile communication terminal apparatus 200. For example, as in step S1001, a charging table selection criterion acquisition request from the mobile communication terminal apparatus 200 is detected. The processing in FIG. 12 assumes a state (soft-off) in which the power supply of the MFP 300 is OFF, but power is supplied from an AC power supply. Assume that the CPU 502 is operable in the soft-off state and can read out data from the NFC unit 517.

In step S1202, it is determined whether the MFP 300 is in the power-off state or sleep mode. If it is determined that the MFP 300 is in the power-off state or sleep mode, the process advances to step S1203 to turn on the power supply, and then to step S1204. If it is determined that the MFP 300 is neither in the power-off state nor in the sleep mode, the process advances to step S1204. Since the MFP 300 performs initialization of the CPU 502, activation of the OS, initialization of the memory, and the like after power-on, a time of several ten sec is taken until the CPU 502 actually operates and a job can be received. After power-on in step S1203, reception of a job becomes possible when the process advances to step S1207. By control to prepare power-on of the MFP 300 when the MFP 300 receives communication from the mobile communication terminal apparatus 200, the activation of the MFP 300 and the selection of a table can be performed parallelly, saving the time for the user. In step S1204, the processing in step S1002 is executed. Step S1205 corresponds to steps S1003, S1004, and S1005. In step S1206, a charging table identifier and charging table are transmitted to the mobile communication terminal apparatus 200.

In the transmission processing in steps S1204 to S1206, the NFC unit 517 acts as a target in the passive mode of NFC and transmits data. Even if the activation processing which has started in step S1203 has not been completed yet in steps S1204 to S1206, data can be transmitted. Alternatively, when the activation processing of the MFP 300 is completed in steps S1204 to S1206, or after waiting for the completion of the activation processing, data may be transmitted. In this case, the NFC unit 517 can act as an initiator in the active mode or passive mode of NFC, and transmit data.

After it is confirmed in step S1207 that the MFP has been turned on and predetermined activation processing has been completed, a job is received from the mobile communication terminal apparatus 200, and the process advances to step S1208.

In step S1207, the job information A 804, estimated money amount 805, and used charging table 806 are received, as described with reference to FIG. 8. The charging amount is estimated based on the job information A 804. In step S1208, the money amount estimated in the MFP 300, and the estimated money amount 805 received from the mobile communication terminal apparatus 200 are compared to determine whether these money amounts are different. If it is determined that these money amounts are different, the process advances to step S1209. If it is determined that these money amounts are equal, the process advances to step S1210.

In step S1209, the charging table used in estimation by the MFP 300 and the charging table 806 used in estimation by the mobile communication terminal apparatus 200 are compared to determine whether these charging tables are different. If it is determined that these charging tables are different, the process advances to step S1212. If it is determined that these charging tables are the same, the process advances to step S1211.

The process advances to step S1211 when the money amounts estimated in the mobile communication terminal apparatus 200 and MFP 300 are different though the used charging tables are the same. This phenomenon arises from the contents of image processing, and may occur when a page is broken owing to an error of an image processing program or the like, or when the version of the image processing program is different. In such a case, a warning screen as shown in FIG. 15B is displayed on the display unit 511 to the user. This can reduce the possibility of causing a misunderstanding in which the user trusts a money amount estimated in the mobile communication terminal apparatus 200 and executes a job, but the charging amount is different.

In step S1212, a warning screen as shown in FIG. 15A is displayed on the display unit 511 to the user. From this, the user can recognize that the estimate has been made using a different charging table, and can be prompted to update the charging table. In step S1214, the charging table of the MFP 300 is updated automatically or manually, and the process advances to step S1208. Steps S1213 and S1215 correspond to steps S1010 to S1014.

Figure 13:
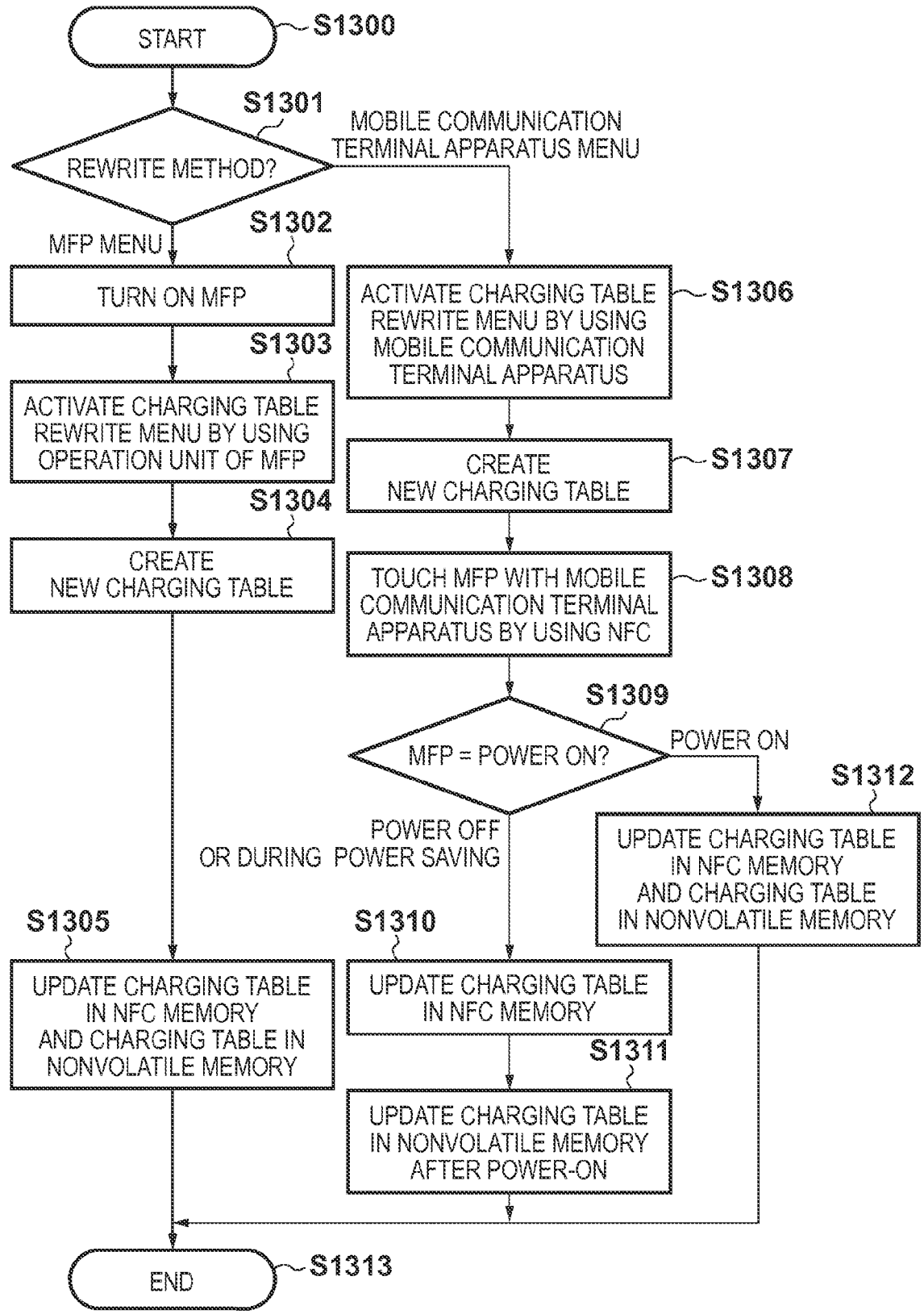
FIG. 13 is a flowchart showing a sequence to rewrite a charging table.

Next, a sequence to rewrite (update) a charging table will be explained with reference to FIG. 13. FIG. 13 shows roughly two rewrite methods: a setting method using the operation unit 305 of the MFP 300 in steps S1302 to S1305, and a setting method using the mobile communication terminal apparatus 200 in steps S1306 to S1312. The process starts from step S1300. In step S1301, the user selects a rewrite method. First, the method using the operation unit 305 will be explained.

In step S1302, if the MFP 300 is in the power-off or power saving state, the user turns on the MFP 300. The user activates a charging table rewrite application by using the operation unit 305 of the MFP 300 in step S1303, and creates a new charging table in step S1304. The contents to be created include the items 708 to 715 and the items 711 to 729 in FIGS. 7A and 7B. As the contents by which the charging table is rewritten, only some of the contents may be rewritten as long as consistency is ensured, or all the contents of the charging table may be rewritten.

Details of steps S1303, S1304, S1306, and S1307 will be explained with reference to FIGS. 18A to 18F. An application in the MFP 300 performs steps S1303 and S1304, and an application in the mobile communication terminal apparatus 200 performs step S1306. However, the contents of operations by the user are the same, so one example will be explained representatively. When the user activates a charging table rewrite menu, first, a screen in FIG. 18A is displayed.

An item 1801 is an item for editing the charging table selection criterion 708. The user selects one of the department ID, user ID, application ID, and coupon ID as a charging table selection criterion. An item 1802 is an item capable of setting the priority of each item. After selecting items in FIG. 18A, the screen advances to one in FIG. 18B. In FIG. 18B, the user selects a charging table to be rewritten, and then the screen advances to one in FIG. 18C.

On the screen of FIG. 18C, the user selects, as an item to be modified, a charging table identifier or a charging table for each job. For example, when the user selects a charging table A identifier 1804, the screen advances to one in FIG. 18D. When the user selects a charging table A print job 1805, the screen advances to one in FIG. 18E. In FIG. 18D, the user changes the charging table A identifier to a desired setting. In FIG. 18E, the user selects the item of a fee to be modified in the charging table A print job, and the screen advances to one in FIG. 18F. In FIG. 18F, the user changes the charging amount per unit depending on the print size. Similarly to FIG. 18F, the user can also change a paper type-based fee 1809 and printing mode-based fee 1810.

If the setting is completed in step S1304, the process advances to step S1305 to update the information 810 about the charging tables in both the NFC memory 605 and nonvolatile memory 505 of the MFP 300. After that, the process advances to step S1313, ending this processing.

Next, a case in which the rewrite method uses the mobile communication terminal apparatus 200 will be explained from step S1306. In step S1306, the user activates the charging table rewrite application of the mobile communication terminal apparatus 200, and sets necessary matters. Contents to be set in steps S1306 and S1307 are the same as those in steps S1303 and S1304.

In step S1308, the user changes the NFC communication mode of the mobile communication terminal apparatus 200 from the target to the initiator, and then touches the NFC unit 306. After performing a predetermined handshake, the mobile communication terminal apparatus 200 and MFP 300 can transmit/receive data. In step S1309, it is determined whether the state of the MFP 300 is the power-off or power saving state. If it is determined that the state of the MFP 300 is the power-off or power saving state, the process advances to step S1310. If it is determined that the state of the MFP 300 is not the power-off or power saving state (that is, the state of the MFP 300 is the power-on state), the process advances to step S1312.

In step S1310, the information 810 about the charging table in the NFC memory 605 is updated. In step S1311, the information 810 about the charging table in the nonvolatile memory 422 is updated at the timing when the MFP 300 is turned on. In step S1312, the information 810 about the charging tables in both the NFC memory 605 and nonvolatile memory 422 is updated by the charging table created in step S1307. This processing ends in step S1313.

By executing the sequence shown in FIG. 13, the user can update a charging table without waiting for activation even when the MFP 300 is in the power-off or power saving state. Especially in a charging type MFP which is installed in a store such as a convenience store and used by an indefinite number of users, the store manager can easily exchange one or a plurality of charging tables in the NFC memory of the MFP. For example, immediately when a coupon for a discount on the printing fee is issued, the charging table in the NFC memory of the MFP is rewritten. A user in the store can estimate a job in accordance with a discount coupon-applied fee system based on the instantly rewritten charging table.

Note that the above-described embodiment has described an example in which the mobile communication terminal apparatus 200 calculates a charging amount. However, the present invention is not limited to this, and the MFP 300 may calculate a charging amount by using a charging table corresponding to the mobile communication terminal apparatus 200, and notify the mobile communication terminal apparatus 200 of the charging amount.

Further, the present invention is not limited to the case in which the charging amount is notified from the MFP 300 to the mobile communication terminal apparatus 200 and is displayed. When the MFP 300 receives a print job, it may calculate a charging amount by using a charging table, notify the mobile communication terminal apparatus 200 of the calculated charging amount, and perform charging.

Also, the above-described embodiment has described an example in which the charging amount is specified by calculating a charging amount based on the charging table, but the present invention is not limited to this. For example, it is also possible to store a charging amount corresponding to a pattern of printing designations in the charging table, specify a pattern for printing designations input from a communication terminal, and specify a charging amount corresponding to the pattern.

Further, the form of information representing a charging method for specifying a charging amount is not limited to the table. The charging method may be stored in the MFP 300 based on pieces of information in various forms.

The above-described embodiment has described an example in which the MFP 300 stores a charging method, and the MFP 300 or communication terminal specifies a charging amount. However, the present invention is not limited to this, and an external apparatus (for example, a server on a network) for the MFP 300 may execute these processes. In this case, the MFP 300 requests the above-mentioned processes of the external apparatus in response to execution of NFC communication of the MFP 300 with the communication terminal. The MFP 300 is notified of a charging amount specified by the external apparatus, and notifies the communication terminal of it by NFC. Alternatively, the MFP 300 may acquire information (for example, email address) for notifying the communication terminal by NFC, and transmit it to the external apparatus. Then, the external apparatus may notify the communication terminal of a charging amount by using the information without the intervention of the MFP 300.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disc (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-159714, filed Jul. 31, 2013, which is hereby incorporated by reference herein in its entirety.

What is claimed is:

1. A system including a communication terminal, and a processing apparatus configured to execute a job received from the communication terminal,
   wherein the processing apparatus comprises:
   a changing unit configured to change content of a charging method of a plurality of charging methods which are stored in the processing apparatus and correspond to a plurality of types of identification information;
   a determination unit configured to determine a charging method corresponding to a type of identification information acquired from the communication terminal; and
   a transmission unit configured to transmit, to the communication terminal, information relating to the charging method determined by said determination unit, wherein, in a case where the content of the charging method is changed by said changing unit, the information relating to the charging method of which the content is changed by said changing unit is transmitted to the communication terminal,
   wherein the communication terminal comprises:
   an acquisition unit configured to acquire, from the processing apparatus, the information transmitted by said transmission unit;
   a specifying unit configured to specify, based on the information acquired by said acquisition unit, a charging amount for the job to be transmitted from the communication terminal to the processing apparatus; and
   a charging unit configured to execute a charging process by the charging amount specified by said specifying unit, using electronic money in the communication terminal.

2. The system according to claim 1, wherein said determination unit acquires the identification information from the communication terminal, and determines the charging method corresponding to the type of the acquired identification information.

3. The system according to claim 1, further comprising a save unit configured to save an acquisition history of the charging method acquired by said acquisition unit.

4. The system according to claim 1, wherein
   the communication terminal further comprises a second transmission unit configured to transmit, to the processing apparatus, the job, and the charging amount specified by said specifying unit, and the processing apparatus further comprises:
- a second determination unit configured to specify a second charging amount in execution of the job received from the communication terminal, and determine whether the second charging amount and the charging amount which has been specified by said specifying unit and received from the communication terminal match each other;
- a display unit configured to display a warning screen in a case where said second determination unit determines that the two charging amounts do not match each other; and
- an execution unit configured to execute predetermined processing based on the job in a case where said second determination unit determines that the two charging amounts match each other.

5. The system according to claim 1, wherein the identification information includes at least one of information for identifying a user of the communication terminal, information for identifying an application, in the communication terminal, which causes the processing apparatus to execute the job, and information for identifying a coupon held in the communication terminal.

6. The system according to claim 1, wherein the information transmitted by said transmission unit is information indicating the charging method.

7. The system according to claim 1, wherein said determination unit further determines charging amount for the job to be transmitted from the communication terminal to the processing apparatus, and the information transmitted by said transmission unit is information indicating the determined charging amount.

8. The system according to claim 1, wherein the processing apparatus is a printer, and executes printing based on a print job received from the communication terminal.

9. The system according to claim 1, wherein said transmission unit performs a transmission via an NFC (Near Field Communication).

10. The system according to claim 9,
wherein in a case where said transmission unit performs the transmission by using an NFC unit serving as a target in a passive mode in the NFC, said determination unit does not determine the charging method and said transmission unit transmits information representing the plurality of charging methods stored in a NFC memory, and
wherein said acquisition unit acquires the plurality of charging methods represented by the information representing the plurality of charging methods transmitted from the NFC memory by said transmission unit.

11. The system according to claim 10, wherein said acquisition unit acquires the plurality of charging methods, selects a charging method corresponding to the type of the identification information from the plurality of charging methods, and determines the charging method.

12. The system according to claim 10, wherein said acquisition unit further acquires the charging method from the plurality of charging methods based on information representing priority of each of the plurality of charging methods, and the identification information.

* * * * *